US012339010B2

(12) United States Patent
Lee et al.

(10) Patent No.: US 12,339,010 B2
(45) Date of Patent: Jun. 24, 2025

(54) COOKING APPARATUS

(71) Applicant: SAMSUNG ELECTRONICS CO., LTD., Suwon-si (KR)

(72) Inventors: Chulwoo Lee, Suwon-si (KR); Sangwon Yun, Suwon-si (KR); Jaegyeong Ma, Suwon-si (KR); Yesil Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 479 days.

(21) Appl. No.: 17/730,357

(22) Filed: Apr. 27, 2022

(65) Prior Publication Data

US 2023/0003392 A1 Jan. 5, 2023

Related U.S. Application Data

(63) Continuation of application No. PCT/KR2022/005551, filed on Apr. 18, 2022.

(30) Foreign Application Priority Data

Jul. 2, 2021 (KR) ........................ 10-2021-0087059
Jul. 22, 2021 (KR) ........................ 10-2021-0096728

(51) Int. Cl.
*F24C 15/20* (2006.01)
*F24C 7/02* (2006.01)
*H05B 6/64* (2006.01)

(52) U.S. Cl.
CPC ............ *F24C 15/2035* (2013.01); *F24C 7/02* (2013.01); *H05B 6/6414* (2013.01)

(58) Field of Classification Search
CPC .................................. F24C 7/02; F24C 15/20
See application file for complete search history.

(56) References Cited

U.S. PATENT DOCUMENTS 6,586,716 B1 7/2003 Lee
9,888,531 B2 2/2018 Imm et al.
(Continued)

FOREIGN PATENT DOCUMENTS

KR 2000-0055449 A 9/2000
KR 10-0444964 8/2004
(Continued)

OTHER PUBLICATIONS

International Search Report dated Aug. 5, 2022 in International Patent Application No. PCT/KR2022/005551 (3 pages; 4 pages English translation).
(Continued)

*Primary Examiner* — Ko-Wei Lin
(74) *Attorney, Agent, or Firm* — STAAS & HALSEY LLP

(57) ABSTRACT

A cooking apparatus including a main body forming a cooking room therein and including a front plate with an opening to the cooking room; a case positioned to one side of the opening and formed to accommodate a circuit board therein; a door opening and closing the opening and covering a front portion of the case, wherein a portion of a rear surface of the door is depressed inward to accommodate the case. The cooking apparatus includes a circulating air outlet formed at a top of the main body, and configured to filter and discharge air received from below the main body; and a suction grill attachable to and detachable from an upper portion of the case and accommodated in one side of the door, wherein a cooling air inlet, which allows cooling air to enter through the suction grill, is positioned in front of the circulating air outlet.

14 Claims, 18 Drawing Sheets

1

(56) References Cited

U.S. PATENT DOCUMENTS

| | | | | |
|---|---|---|---|---|
| 10,197,289 | B2 | 2/2019 | Kim | |
| 10,278,240 | B2 * | 4/2019 | Ham | H05B 6/6414 |
| 2006/0081623 | A1 | 4/2006 | Cho | |

FOREIGN PATENT DOCUMENTS

| | | | |
|---|---|---|---|
| KR | 10-2005-0062794 | | 6/2005 |
| KR | 20-0422400 | | 7/2006 |
| KR | 10-0786087 | | 12/2007 |
| KR | 10-1110182 | | 2/2012 |
| KR | 10-1119094 | | 3/2012 |
| KR | 10-2013-0001251 | A | 1/2013 |
| KR | 10-2015-0028390 | A | 3/2015 |
| KR | 10-2016-0134288 | A | 11/2016 |
| KR | 10-1680969 | | 12/2016 |
| KR | 10-1686303 | | 12/2016 |
| KR | 10-2017-0002046 | A | 1/2017 |

OTHER PUBLICATIONS

PCT/ISA/237 dated Aug. 5, 2022 in International Patent Application No. PCT/KR2022/005551 (3 pages).

* cited by examiner

COOKING APPARATUS

CROSS-REFERENCE TO RELATED APPLICATION

This application is a continuation application, under 35 U.S.C. § 111(a), of International Patent Application No. PCT/KR2022/005551, filed on Apr. 18, 2022, which based on and claims benefit of priority under 35 U.S.C. § 119 to Korean Patent Application No. 10-2021-0087059, filed on Jul. 2, 2021, and Korean Patent Application No. 10-2021-0096728, filed on Jul. 22, 2021 in the Korean Intellectual Property Office, the disclosures of which are incorporated by reference herein in their entireties.

BACKGROUND

1. Field

The disclosure relates to a cooking apparatus with an improved structure, and more particularly, to a cooking apparatus having a cooling flow path with an improved structure.

2. Description of the Related Art

A cooking apparatus, which is an apparatus for cooking a cooking material such as food by heating the cooking material, means an apparatus capable of providing various functions related to cooking, such as heating, defrosting, drying, sterilizing, etc. of a cooking material. Examples of the cooking apparatus include an oven, such as a gas oven or en electric oven, a microwave heating apparatus (hereinafter, referred to as a microwave), a gas range, an electric range, an Over The Range (OTR), a gas grill, an electric grill, etc.

The OTR is a microwave combined with a hood function being in charge of ventilation in the kitchen, and the OTR can easily and efficiently cook food in a small installation space. The OTR is positioned above a cooking apparatus, such as a gas range or a cooktop.

The OTR among the cooking apparatuses includes a circulating flow path for sucking polluted air generated below the OTR and discharging the polluted air to the outside of the OTR, and a cooling flow path for cooling a machine room, etc.

However, in the case in which a circulating air outlet through which air flowing along the circulating flow path is discharged is close to a cooling air inlet through which air enters the cooling flow path, the cooling efficiency of the OTR may deteriorate.

SUMMARY

A cooking apparatus according to a concept of the disclosure includes: a main body forming a cooking room therein and including a front plate with an opening to the cooking room; a case positioned to one side of the opening and formed to accommodate a circuit board therein; a door opening and closing the opening and covering a front portion of the case, wherein a portion of a rear surface of the door is depressed inward to accommodate the case; a circulating air outlet formed at a top of the main body, and configured to filter and discharge air received from below the main body; and a suction grill attachable to and detachable from an upper portion of the case and accommodated in one side of the door, wherein a cooling air inlet, which allows cooling air to enter through the suction grill, is positioned in front of the circulating air outlet.

The cooking apparatus may further include a discharge panel attachable to and detachable from the main body, wherein the circulating air outlet may be formed in the discharge panel, and the discharge panel may be positioned behind the door.

The case may include: a board accommodating portion formed to accommodate the circuit board; and a grill installing portion formed to extend upward from the board accommodating portion and protrude forward from the board accommodating portion.

The suction grill may be coupleable with the grill installing portion, and air may enter the upper portion of the case through the suction grill.

The door may include: a first cover portion depressed along a front direction to cover a front surface of the grill installing portion; a second cover portion to cover a portion of a front surface of the board accommodating portion; and a handle portion positioned to one side of the second cover portion and forming a grip space in front of the board accommodating portion.

The suction grill may be inclined along a front direction of the door.

The cooling air inlet may be a first cooling air inlet, and the front plate may include a second cooling air inlet provided behind the first cooling air inlet to allow air entering the first cooling air inlet to flow to inside of the main body.

The second cooling air inlet may be formed by partially cutting a front portion of the front plate.

The door may include: a sealing portion opening and closing the opening in front of the cooking room; and a cover portion positioned to one side of the sealing portion and to cover the front portion of the case, wherein a thickness of the cover portion may be smaller than a thickness of the sealing portion.

The sealing portion may be positioned in front of the circulating air outlet, and the suction grill may be positioned to the one side of the sealing portion.

The cooling air inlet of the suction grill may be biased with respect to the circulating air outlet.

The cooking apparatus may further include: a machine room provided behind the front plate where air entering through the suction grill enters the machine room; and a guide duct to guide the air entering the machine room to the cooking room.

The cooking apparatus may further include an exhaust duct to discharge air entering the cooking room through the guide duct to outside.

The suction grill may include: a grill portion in which the cooling air inlet is formed; and a coupling portion positioned to one side of the grill portion and coupleable with the case.

The cooking apparatus may further include: an internal housing forming the cooking room; an external housing positioned outside the internal housing and forming an outer appearance of the cooking apparatus; at least one circulating fan positioned between the internal housing and the external housing and configured to suck polluted air from below the main body; and a partition bracket forming a flow path along which air entering the inside of the main body by the at least one circulating fan flows, the partition bracket positioned behind the internal housing and formed to extend horizontally between the internal housing and the external housing.

A cooking apparatus according to another concept of the disclosure includes: a main body forming a cooking room therein; a circulating air inlet provided at a bottom of the main body; a circulating air outlet provided at a top of the main body and discharging air entering the circulating air inlet; a door opening and closing the cooking room; and a control unit coupleable with the main body in such a way as to protrude forward from the main body, wherein a front portion of the control unit is covered by the door, and a cooling air inlet biased with respect to the circulating air outlet is formed at an upper portion of the control unit.

The control unit may include a case, and a suction grill attachable to and detachable from with an upper portion of the case, wherein the cooling air inlet is formed in an upper portion of the suction grill.

The cooling air inlet may be a first cooling air inlet, and the main body may further include a front plate on which the control unit is installed and which is cut to form a second cooling air inlet communicating with the first cooling air inlet.

A cooking apparatus according to another concept of the disclosure includes: a main body including a front plate with an opening and a circulating air outlet provided behind the front plate and configured to filter and discharge air entering inside of the main body; a door including a sealing portion opening and closing the opening and provided in front of the circulating air outlet and a handle portion provided to one side of the sealing portion and depressed inward from a rear surface of the door; and a control unit installed behind the handle portion and formed to protrude toward the door, wherein the control unit includes a case to be accommodated in one side of the door, and a suction grill provided in front of the circulating air outlet, allowing air to enter the one side of the sealing portion, and coupleable with an upper portion of the case, wherein a cooling air inlet is formed in an upper portion of the suction grill.

The circulating air outlet may be provided behind the sealing portion, and the cooling air inlet may be provided to one side of the sealing portion.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
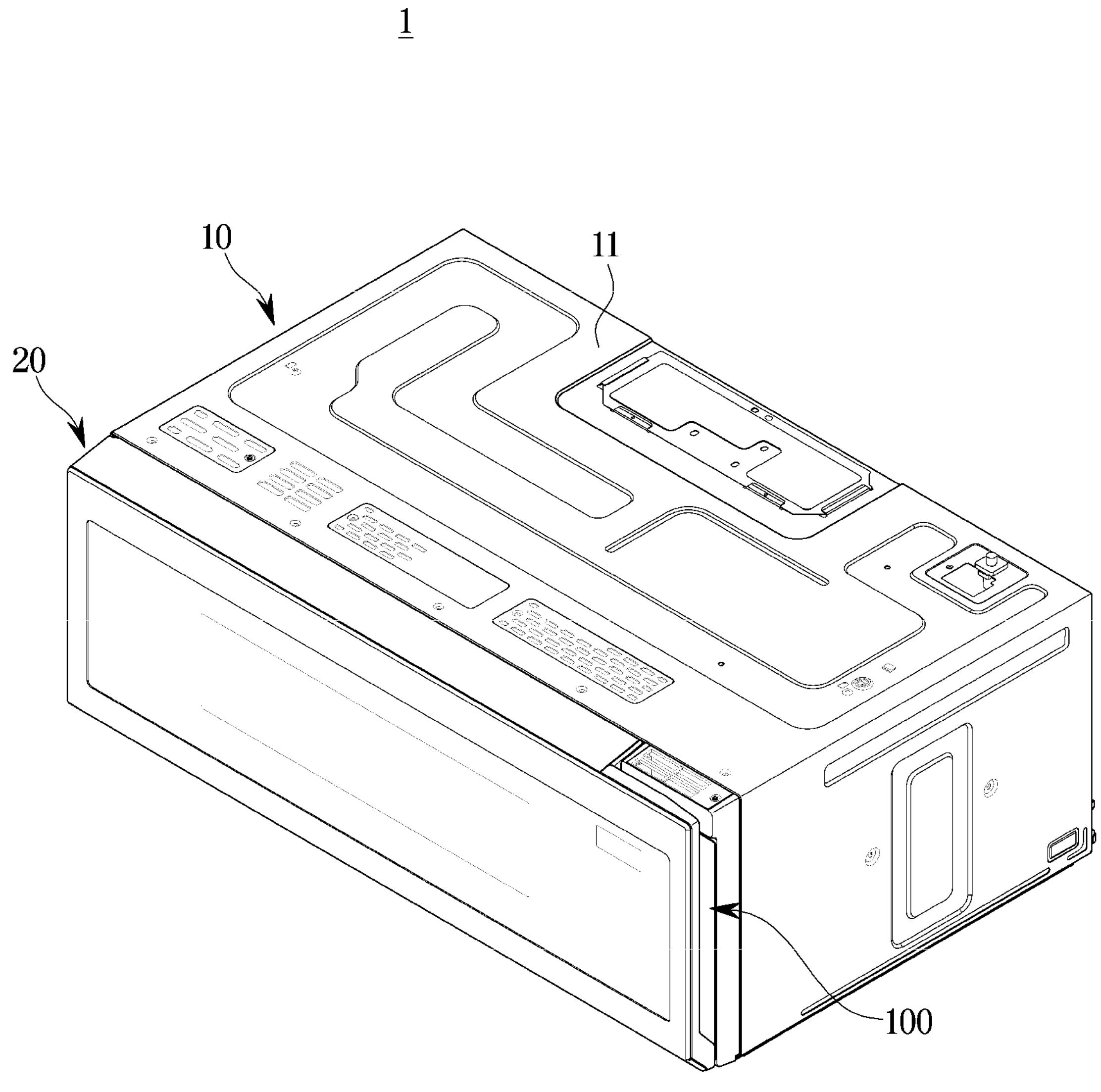
FIG. 1 is a perspective view of a cooking apparatus according to an embodiment of the disclosure.

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe embodiments, and are not intended to restrict and/or limit the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

It will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the disclosure. As used herein, the term "and/or" includes any and all combinations of one or more of associated listed items.

Throughout the disclosure, the expression "at least one of a, b or c" indicates only a, only b, only c, both a and b, both a and c, both b and c, all of a, b, and c, or variations thereof.

Therefore, it is an aspect of the disclosure to provide a cooking apparatus having a cooling flow path with improved cooling efficiency.

It is another aspect of the disclosure to provide a cooking apparatus capable of implementing a slim door.

Hereinafter, embodiments of the disclosure will be described in detail with reference to the accompanying drawings.

Figure 2:
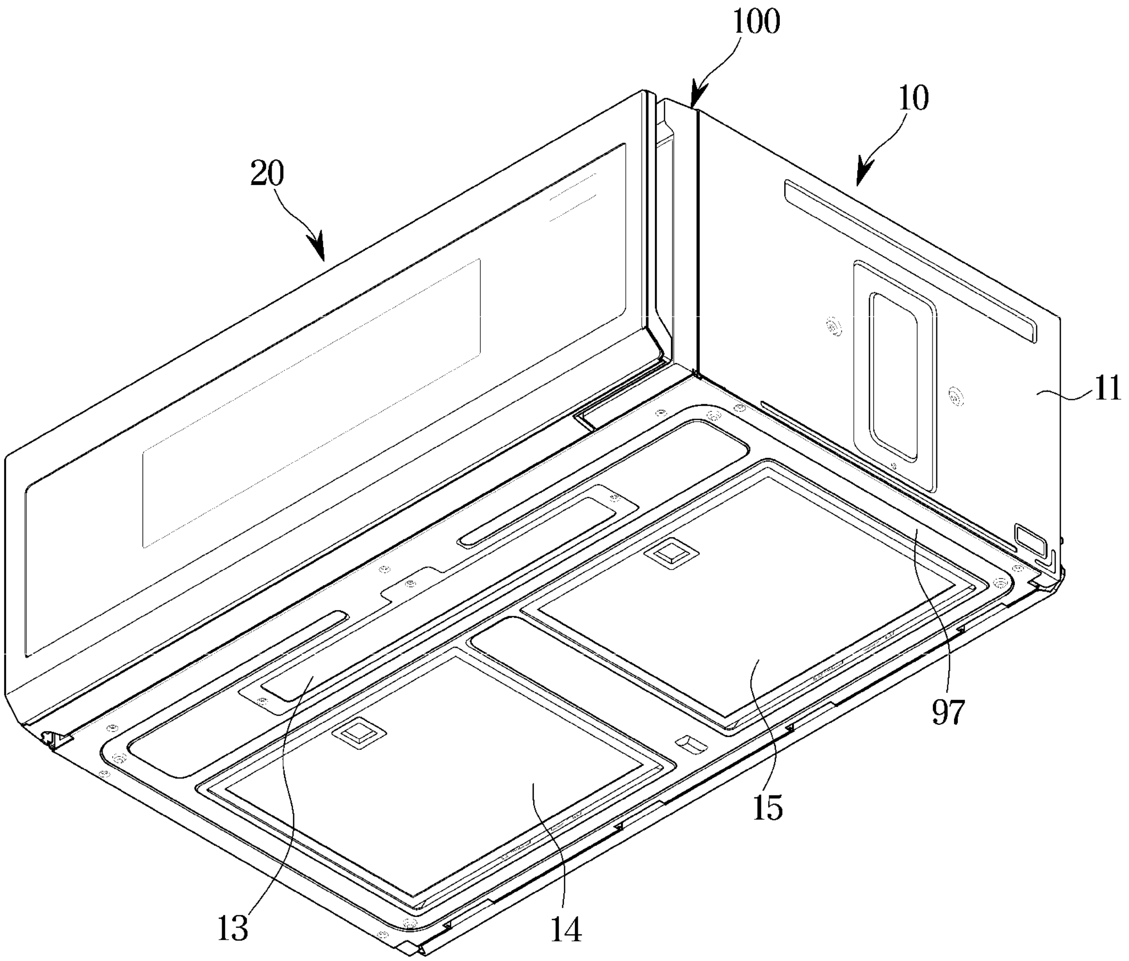
FIG. 2 is a bottom perspective view of a cooking apparatus according to an embodiment of the disclosure.
Figure 3:
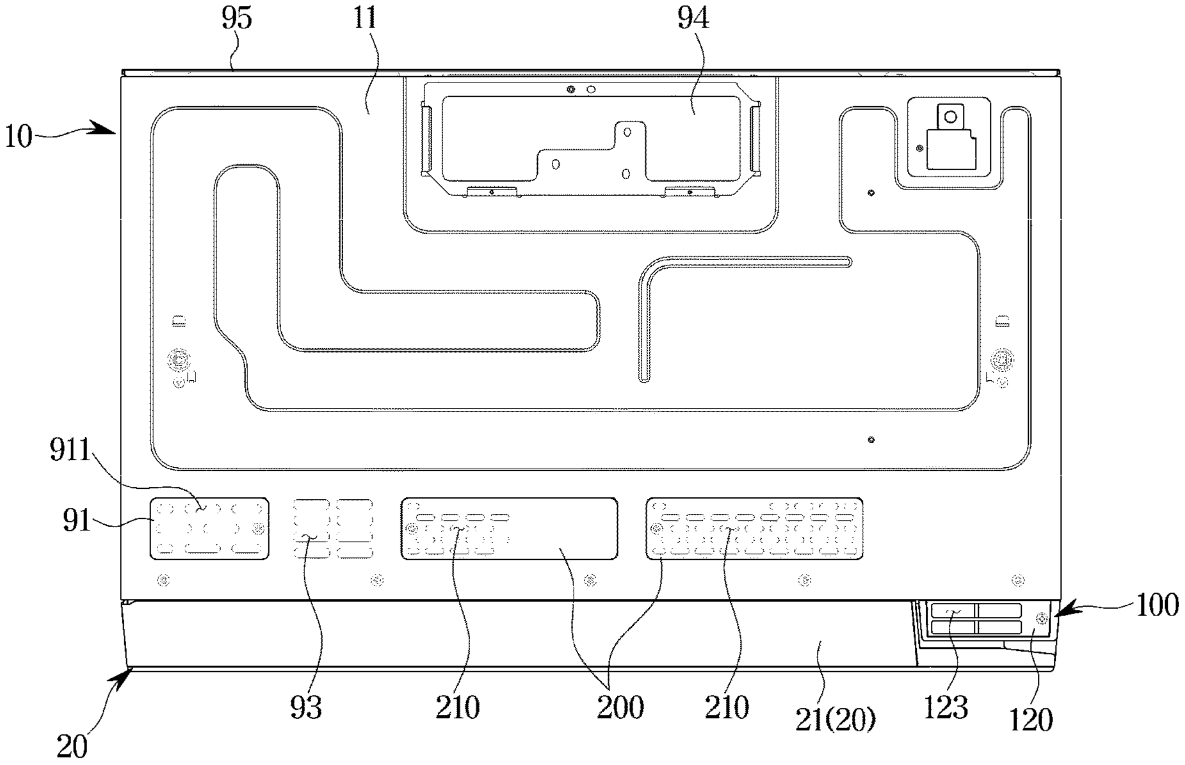
FIG. 3 is a top view of a cooking apparatus according to an embodiment of the disclosure.

FIG. 1 is a perspective view of a cooking apparatus according to an embodiment of the disclosure. FIG. 2 is a bottom perspective view of a cooking apparatus according to an embodiment of the disclosure. FIG. 3 is a top view of a cooking apparatus according to an embodiment of the disclosure.

A cooking apparatus 1 according to an embodiment of the disclosure may be an Over The Range (OTR). Hereinafter, an OTR will be described as the cooking apparatus 1.

Referring to FIGS. 1 to 3, the cooking apparatus 1 may include a main body 10, and a door 20 coupled with a front portion of the main body 10.

The cooking apparatus 1 may include a control unit 100 coupled with the front portion of the main body 10. A front portion of the control unit 100 may be covered by the door 20. More specifically, the control unit 100 may be coupled with the main body 10 in such a way as to be positioned between the door 20 and the main body 10.

A portion of a rear surface of the door 20 may be depressed to cover the front portion of the control unit 100.

In a bottom of the main body 10, a first circulating air suction portion 14 and a second circulating air suction portion 15 may be formed. More specifically, the first circulating air suction portion 14 and the second circulating air suction portion 15 may be formed in a bottom plate 97 of the main body 10.

Oil mist, etc. generated below the cooking apparatus 1 may be sucked into inside of the cooking apparatus 1 through the first circulating air suction portion 14 and the second circulating air suction portion 15. More specifically, the first circulating air suction portion 14 may include a first circulating air inlet, and the second circulating air suction portion 15 may include a second circulating air inlet. The sucked oil mist may be filtered by a filter (not shown) installed inside the cooking apparatus 1 and then discharged to outside of the cooking apparatus 1. Such a circulating flow path will be described in detail below.

The main body 10 may include a lighting unit 13. The lighting unit 13 may be positioned in front of the first circulating air suction portion 14 and the second circulating air suction portion 15. In a case in which a cooktop, etc. is installed below the cooking apparatus 1, the lighting unit 13 may irradiate light downward from the cooking apparatus 1.

On a top of the main body 10, a service panel 91 and a discharge panel 200 may be positioned. More specifically, the service panel 91 may be detachably mounted on a top of an external housing 11, and the discharge panel 200 may be detachably mounted on the top of the external housing 11.

Also, a ventilation duct panel 94 may be positioned on the top of the main body 10. The ventilation duct panel 94 may be detachably mounted on the external housing 11.

According to an embodiment of the disclosure, two discharge panels 200 may be provided. However, the number of the discharge panels 200 is not limited to two.

The service panel 91 may include a first circulating air outlet 911. Each of the discharge panels 200 may include a second circulating air outlet 210.

Polluted air entering the inside of the main body 10 through the first circulating air suction portion 14 and the second circulating air suction portion 15 formed in the bottom of the main body 10 may be filtered and then discharged to the outside of the cooking apparatus 1 through the first circulating air outlet 911 and the second circulating air outlet 210.

As understood from the above description about the cooking apparatus 1 according to an embodiment of the disclosure, the first circulating air outlet 911 and the second circulating air outlet 210 may be formed in the service panel 91 and the discharge panel 200, and filtered air may be discharged to indoor through the top of the cooking apparatus 1, although not limited thereto.

However, in a case in which a separate communicating duct (not shown) connected to outdoor is provided in a space where the cooking apparatus 1 is installed, the service panel 91 may not include the first circulating air outlet 911, and the discharge panel 200 may also not include the second circulating air outlet 210.

Instead, a circulating air outlet may be formed in the ventilation duct panel 94. In this case, oil mist entered the first circulating air inlet and the second circulating air inlet may be filtered, flow to the communicating duct through the ventilation duct panel 94 positioned in a rear portion of the top of the cooking apparatus 1, and then be discharged to the outdoor.

In other words, because the first circulating air outlet 911 is not formed in the service panel 91, the second circulating air outlet 210 is not formed in the discharge panel 200, and the circulating air outlet is formed in the ventilation duct panel 94, all filtered oil mist may be discharged to the outdoor without being discharged to the indoor.

Therefore, indoor air may be kept cleaner and temperature of cooling air entering through a cooling flow path C which will be described below may be lowered, which may result in an increase of cooling efficiency of the cooking apparatus 1.

Also, because the service panel 91, the discharge panel 200, and the ventilation duct panel 94 are detachable from the external housing 11, the service panel 91, the discharge panel 200, and the ventilation duct panel 94 may be installed in the external housing 11 as necessary.

More specifically, in a case in which filtered air needs to be discharged to the indoor because no separate communicating duct (not shown) is provided, the service panel 91 and the discharge panel 200 having circulating air outlets may be installed in the external housing 11, and the ventilation duct panel 94 having no circulating air outlet may be installed in the external housing 11.

In contrast, in a case in which filtered air does not need to be discharged to the indoor because a separate communicating duct (not shown) is provided, the service panel 91 and the discharge panel 200 having no circulating air outlets may be installed in the external housing 11, and the ventilation duct panel 94 having a circulating air outlet may be installed in the external housing 11.

The control unit 100 may be coupled with the front portion of the main body 10, and a suction grill 120 may be coupled with an upper portion of the control unit 100.

The suction grill 120 may be positioned in front of the discharge panel 200. More specifically, the suction grill 120 may be accommodated in the depressed portion of the door 20 and aligned with the door 20 at one side of the door 20. Also, the suction grill 120 may be positioned behind a portion of the door 20.

Outside air of the cooking apparatus 1 may enter the inside of the main body 10 through the suction grill 120. The suction grill 120 may include a first cooling air inlet 123. Accordingly, air may enter the inside of the main body 10 through the first cooling air inlet 123 formed in the suction grill 120 to cool a machine room 60 (see FIG. 4).

Air entering through the suction grill 120 may cool the machine room 60, enter a cooking room 30 (see FIG. 7) to cool the rear surface of the door 20, and then be discharged through a cooling air outlet 93 formed in the top of the main body 10. More specifically, the cooling air outlet 93 may be formed by cutting a portion of the top of the external housing 11.

Figure 4:
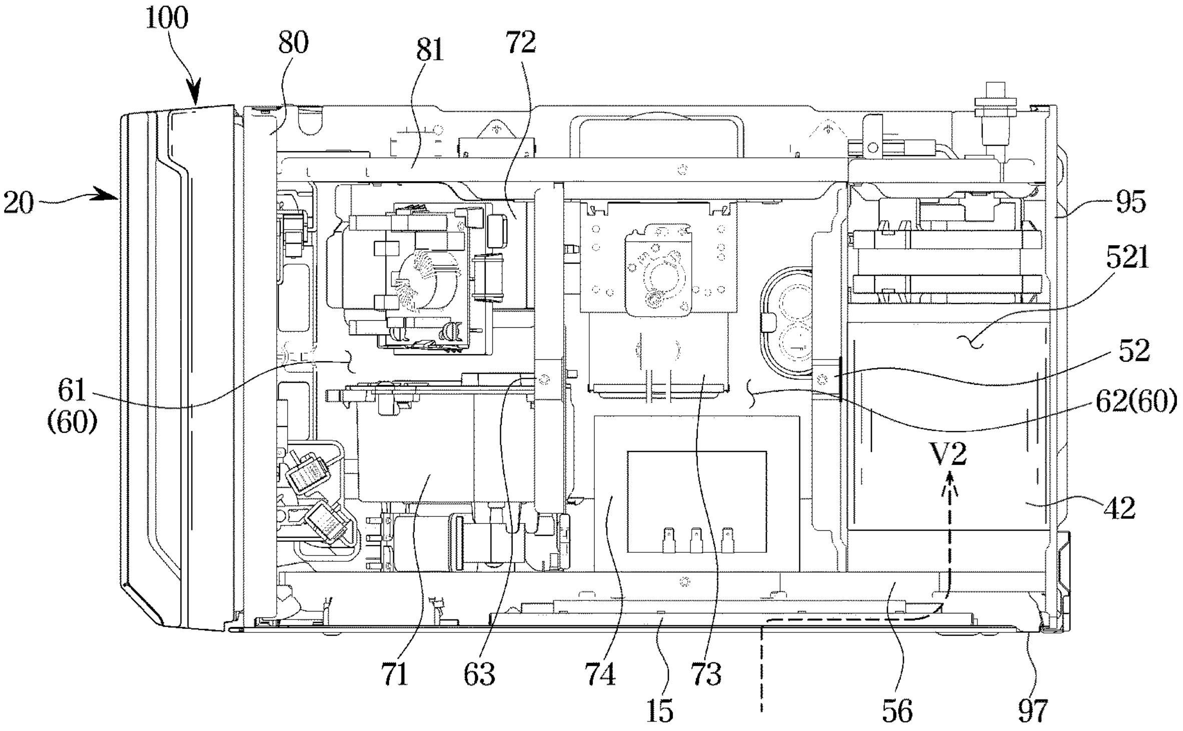
FIG. 4 is a side view showing one side of a cooking apparatus according to an embodiment of the disclosure, after an external housing is removed from the cooking apparatus.
Figure 5:
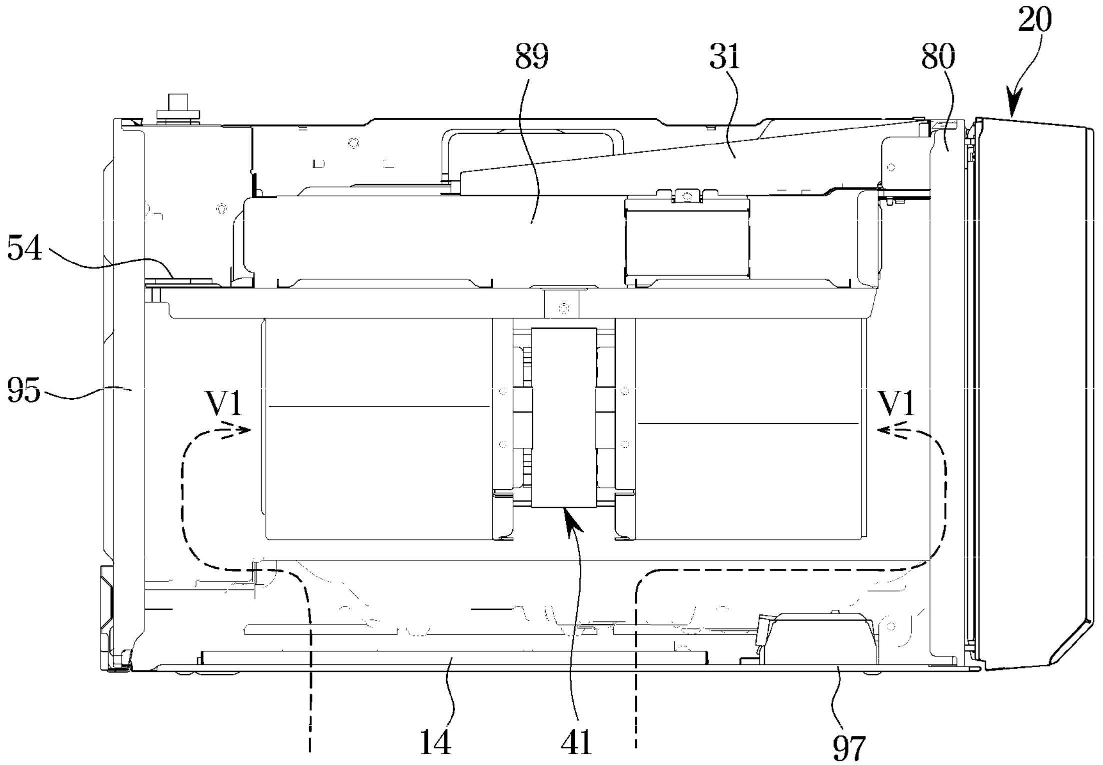
FIG. 5 is a side view showing the other side of a cooking apparatus according to an embodiment of the disclosure, after an external housing is removed from the cooking apparatus.

FIG. 4 is a side view showing one side of a cooking apparatus according to an embodiment of the disclosure, after an external housing is removed from the cooking apparatus. FIG. 5 is a side view showing the other side of a cooking apparatus according to an embodiment of the disclosure, after an external housing is removed from the cooking apparatus.

Referring to FIG. 4, the cooking apparatus 1 may include the machine room 60. More specifically, the machine room 60 may include a first machine room 61 and a second machine room 62.

An internal housing 12 (see FIG. 7) of the main body 10 may include a top plate 81 and a front plate 80.

The control unit 100 may be installed in front of the front plate 80. The first machine room 61 and the second machine room 62 may be provided behind the front plate 80.

The machine room 60 may be partitioned inside the main body 10 by the front plate 80, the top plate 81, a cooling divider 51 (see FIG. 18), and a circulating plate 56. Also, the machine room 60 may be partitioned into two spaces by a partition plate 63 that partitions the first machine room 61 from the second machine room 62. The cooling divider 51 may be provided as one surface of a rear bracket 52.

The circulating plate 56 may form a bottom of the machine room 60. The circulating plate 56 may be spaced from a bottom plate 97 of the external housing 11.

The cooling divider 51 may be positioned above the circulating plate 56 to partition the machine room 60.

As a result of partitioning of the machine room 60 by the circulating plate 56 and the cooling divider 51, oil mist entered through the second circulating air suction portion 15 formed in the bottom of the main body 10 may be prevented from entering the machine room 60. Thereby, components installed inside the machine room 60 may be protected from oil mist or other foreign materials.

A cooling fan 71 may be accommodated in the first machine room 61. The cooling fan 71 may form a flow of air to cause outside air to enter the suction grill 120.

Also, the control unit 100 may be mounted on the front plate 80 in such a way as to communicate with the first machine room 61, which will be described below, and accordingly, air entering the suction grill 120 may cool the control unit 100. Details about this will be described below.

A magnetron 73 and a transformer 74 may be accommodated in the second machine room 62. The magnetron 73 and the transformer 74 may generate a high frequency. The generated high frequency may be supplied to the cooking room 30 to heat a material to be cooked.

Hereinafter, the cooling flow path C of the cooking apparatus 1 will be described.

A portion of the partition plate 63 partitioning the first machine room 61 from the second machine room 62 may open. The partition plate 63 may include a lower opening (not shown) communicating with the cooling fan 71 such that air sucked into the suction grill 120 by the cooling fan 71 passes through the first machine room 61 and enters the second machine room 62. Also, the partition plate 63 may include an upper opening (not shown) communicating the second machine room 62 with the guide duct 72.

Air entering the second machine room 62 may cool the transformer 74 and the magnetron 73 and then flow to the guide duct 72 installed in the partition plate 63. The guide duct 72 may be positioned in the first machine room 61 to form a space through which the second machine room 62 communicates with the cooking room 30.

Accordingly, air entering the guide duct 72 may flow to the cooking room 30 and cool the rear surface of the door 20 during cooking. Thereafter, the air may flow to an exhaust duct 31 communicating with the cooking room 30 at an upper surface of the cooking room 30 and be discharged to the outside of the cooking apparatus 1 through the cool air outlet 93 communicating with the exhaust duct 31.

The cooking apparatus 1 may include circulating flow paths V1 and V2 for sucking oil mist and filtering the oil mist, in addition to the cooling flow path C for cooling the machine room 60 and the door 20.

The cooking apparatus 1 may include a second circulating fan 42 and the rear bracket 52. The rear bracket 52 may include a circulating fan accommodating portion 521 accommodating the second circulating fan 42.

A front portion of the circulating plate 56 may be closed to partition the machine room 60. However, the circulating plate 56 may include a communicating portion 522 opening to communicate with the circulating fan accommodating portion 521 of the rear bracket 52, at a rear portion. Because the communicating portion 522 is formed in the circulating plate 56, oil mist may enter the second circulating air suction portion 15 by a suction force generated by the second circulating fan 42 and be filtered.

Referring to FIG. 5, the cooking apparatus 1 may include a first circulating fan 41. The first circulating fan 41 may generate a suction force to cause air to enter the first circulating air suction portion 14 formed in the bottom plate 97. A side plate 89 of the internal housing 12 may be installed above the first circulating fan 41. A portion of the side plate 89 may be cut such that received air flows to an upper portion of the first circulating fan 41.

Accordingly, the cooking apparatus 1 according to an embodiment of the disclosure may include the first circulating fan 41 and the second circulating fan 42 at both sides. Accordingly, inside the cooking apparatus 1, a plurality of circulating flow paths V1 and V2 having a first circulating flow path V1 through which air flows by the first circulating fan 41 and a second circulating flow path V2 through which air flows by the second circulating fan 42 may be formed. Details about this will be described below.

Figure 6:
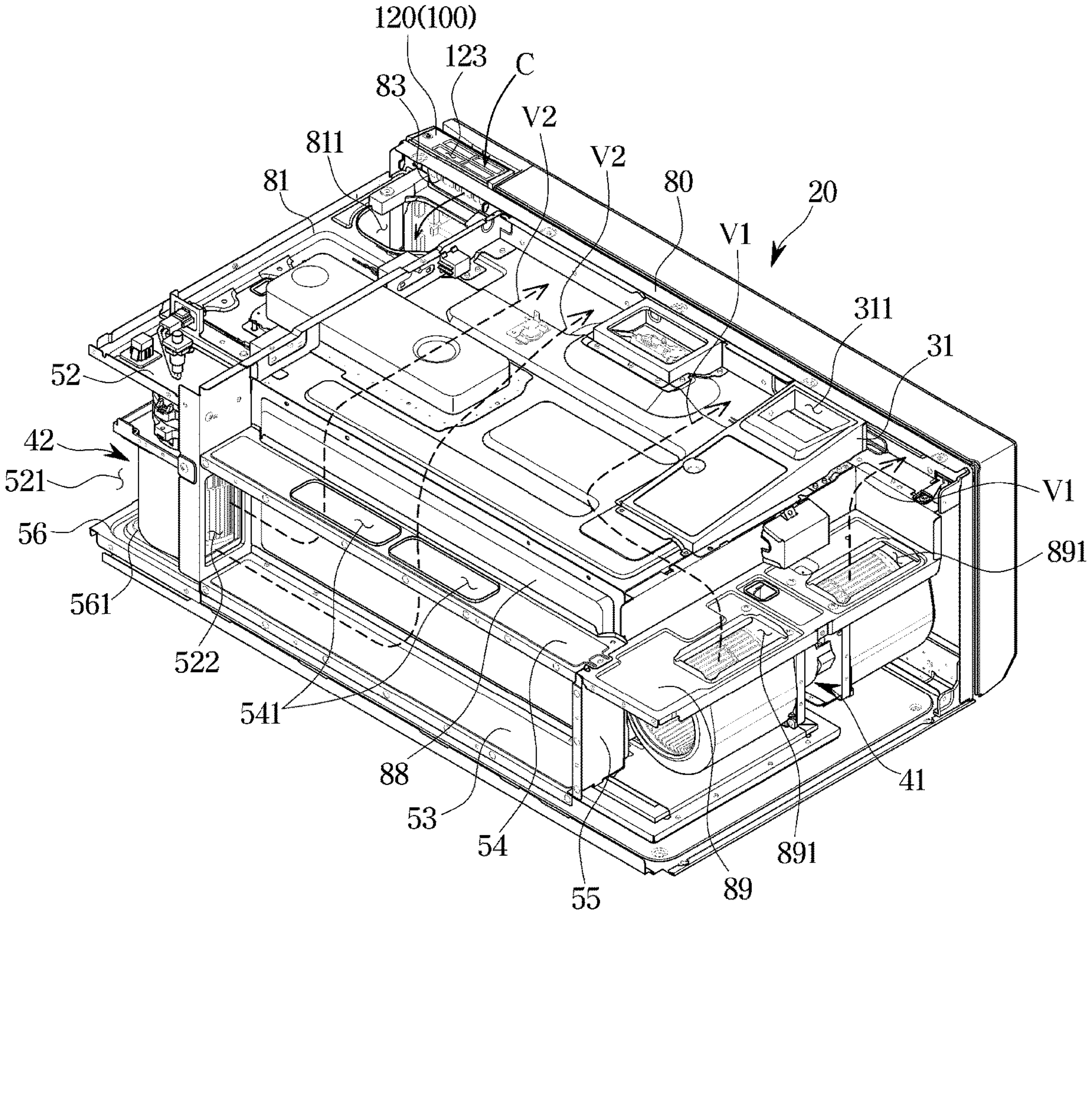
FIG. 6 is a rear perspective view showing a flow of air in a cooking apparatus according to an embodiment of the disclosure after an external housing is removed from the cooking apparatus.
Figure 7:
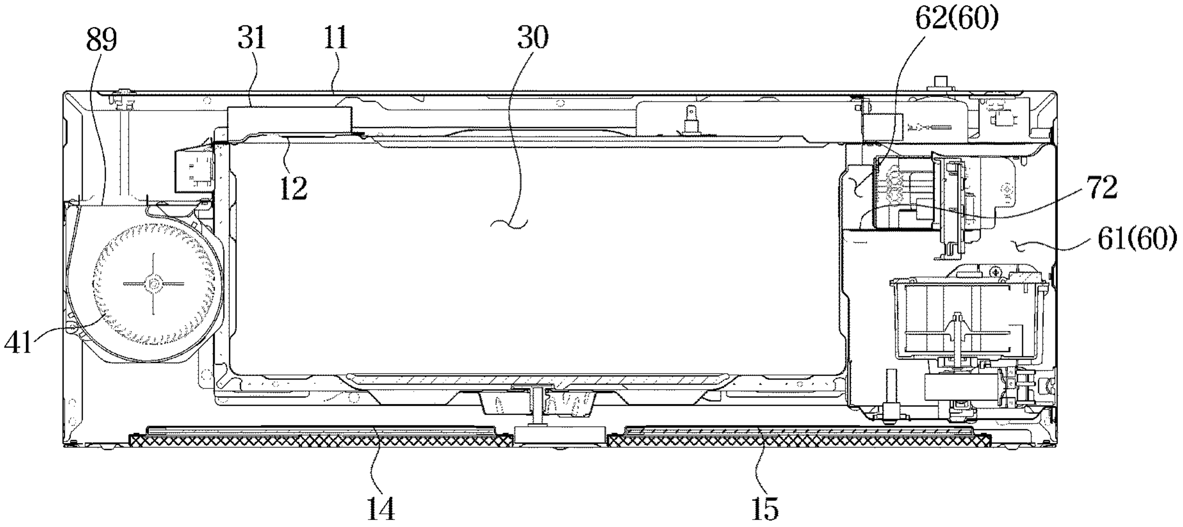
FIG. 7 is a cross-sectional view of a cooking apparatus according to an embodiment of the disclosure.

FIG. 6 is a rear perspective view showing a flow of air in a cooking apparatus according to an embodiment of the disclosure after an external housing is removed from the cooking apparatus. FIG. 7 is a cross-sectional view of a cooking apparatus according to an embodiment of the disclosure.

Hereinafter, the first circulating flow path V1, the second circulating flow path V2, and the cooling flow path C, according to an embodiment of the disclosure, will be described.

Referring to FIGS. 5 and 6, air may enter the inside of the main body 10 through the first circulating air suction portion 14 formed in the bottom of the main body 10. The air may be polluted air containing oil mist.

The air may be filtered and pass through the first circulating fan 41. The air passed through the first circulating fan 41 may flow to the side plate 89 positioned above the first circulating fan 41.

The side plate 89 may include a first communicating hole 891. Air passed through the first circulating fan 41 through the first communication hole 891 may flow over the internal housing 12.

The flowing air may be discharged to the outside of the cooking apparatus 1 through the first circulating air outlet 911 and the second circulating air outlet 210 formed in a front portion of the top of the main body 10, as shown in FIG. 3. This is referred to as the first circulating flow path V1.

However, in a case in which a separate communicating duct is provided to discharge filtered oil mist to the outdoor, as described above, air entering the first circulating air suction portion 14 may be discharged to the outside of the cooking apparatus 1 through the circulating air outlet formed in the ventilation duct panel 94.

Referring to FIGS. 4 and 6, air may enter the inside of the main body 10 through the second circulating air suction portion 15 formed in the bottom of the main body 10. The air may also be polluted air containing oil mist.

The air may be filtered and pass through the second circulating fan 42. More specifically, the air may enter the circulating fan accommodating portion 521 of the rear bracket 52 through a through hole 561 formed in the circulating plate 56.

The rear bracket 52 may include the communicating portion 522. The communicating portion 522 may be formed between a back plate 95 of the external housing 11 and a rear plate 88 of the internal housing 12. Accordingly, air entering the through hole 561 may flow behind the internal housing 12 through the communicating portion 522.

The cooking apparatus 1 may include a bottom bracket 53, a partition bracket 54, and a circulating divider 55.

The bottom bracket 53 and the partition bracket 54 may be positioned between the external housing 11 and the internal housing 12. More specifically, the bottom bracket 53 and the partition bracket 54 may be positioned behind the internal housing 12 and extend horizontally. The bottom bracket 53 may be positioned below the partition bracket 54 to face the partition bracket 54.

The circulating bracket 55 may be positioned between the external housing and the internal housing 12. More specifically, the circulating divider 55 may be positioned behind the internal housing and extend vertically. That is, the circulating divider 55 may face the communicating portion 522 of the rear bracket 52.

The partition bracket 54 may include a second communicating hole 541. The second communicating hole 541 may be formed by cutting a portion of the partition bracket 54. Air may pass through the second communicating hole 541.

Accordingly, the rear bracket 52, the bottom bracket 53, the partition bracket 54, and the circulating divider 55 may form a portion of a flow path along which air entering the second circulating air suction portion 15 flows.

The air entering the second circulating air suction portion 15 may pass through the through hole 561 of the circulating plate 56, pass through the second circulating fan 42, pass through the communicating portion 522 of the rear bracket 52, and then flow between the bottom bracket 53 and the partition bracket 54.

The circulating divider 55 may be closed without any opening and positioned between the partition bracket 54 and the bottom bracket 53. Accordingly, the air may flow over the internal housing 12 from behind the internal housing 12 through the second communicating hole 541 of the partition bracket 54.

The air moved to above the internal housing 12 through the second communicating hole 541 may be again discharged to the outside of the cooking apparatus 1 through the first circulating air outlet 911 and the second circulating air outlet 210 formed in the front top of the main body 10. This is referred to as the second circulating flow path V2.

However, in a case in which a separate communicating duct is provided to discharge filtered oil mist to the outdoor, as described above, air entering the second circulating air suction portion 15 may be discharged to the outside of the cooking apparatus 1 through the circulating air outlet formed in the ventilation duct panel 94.

Because the circulating divider 55 is closed, air entering by the first circulating fan 41 and air entering by the second circulating fan 42 may flow separately below the internal housing 12 and then be mixed above the internal housing 12.

Referring to FIGS. 6 and 7, air entering the suction grill 120 positioned on the upper portion of the control unit 100 may cool various electronic components by flowing through the first machine room 61 and the second machine room 62. More specifically, air entering the first cooling air inlet 123 of the suction grill 120 may enter the inside of the main body 10 through a second cooling air inlet 83 of the front plate 80. Thereafter, the air may enter the inside of the machine room 60 through an incision portion 811 formed in the top plate 81 of the internal housing 12.

Air entering the first machine room 61 may enter the second machine room 62 through the cooling fan 71, and the air entering the second machine room 62 may be guided to the cooking room 30 by the guide duct 72 communicating with the cooking room 30 at the side surface of the cooking room 30. The air guided to the cooking room 30 may cool the rear surface of the door 20, and then flow to the exhaust duct 31 communicating with the cooking room 30 at the upper surface of the cooking room 30. The exhaust duct 31 may communicate with the cooling air outlet 93. Accordingly, completely cooled air may be discharged to the outside of the cooking apparatus 1 through the cooling air outlet 93. This is referred to as the cooling flow path C.

Figure 8:
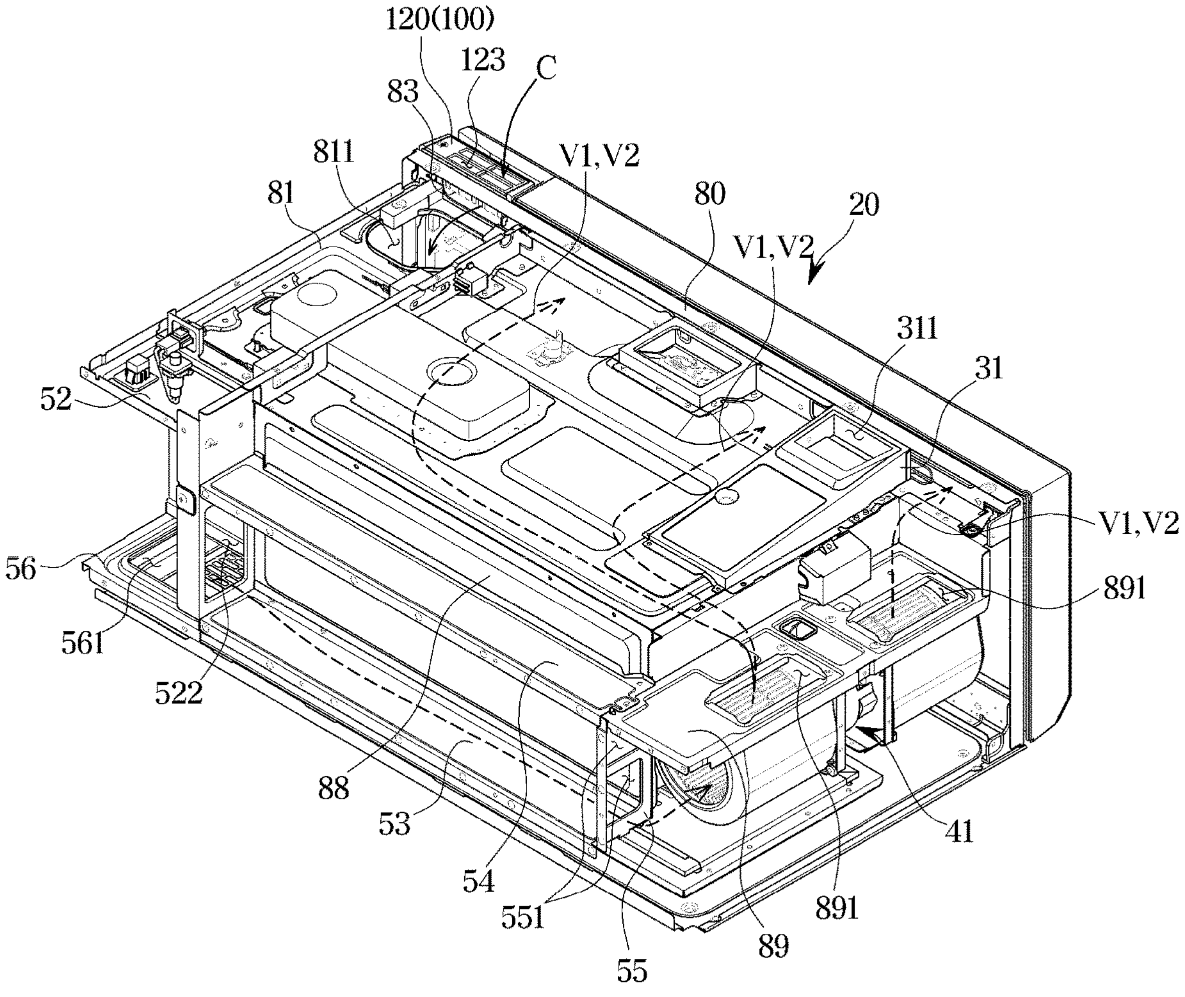
FIG. 8 is a rear perspective view showing a flow of air in a cooking apparatus according to another embodiment of the disclosure, after an external housing is removed from the cooking apparatus.

FIG. 8 is a rear perspective view showing a flow of air in a cooking apparatus according to another embodiment of the disclosure, after an external housing is removed from the cooking apparatus.

A cooking apparatus according to another embodiment of the disclosure may include a single circulating fan 41, unlike the cooking apparatus 1 according to an embodiment of the disclosure. More specifically, the cooking apparatus may include the first circulating fan 41.

Accordingly, the cooking apparatus according to another embodiment of the disclosure may form a single circulating flow path, unlike the cooking apparatus 1 according to an embodiment of the disclosure.

Also, the cooking apparatus according to another embodiment of the disclosure may include the same configurations as the cooking apparatus 1 according to an embodiment of the disclosure, except for different configurations of the circulating divider 55 and the partition bracket 54.

Accordingly, descriptions about the same configurations included in the cooking apparatus 1 as described above will be omitted, and the same configurations will be assigned the same reference numerals.

The cooking apparatus according to another embodiment of the disclosure may include the first circulating fan 41 positioned between the internal housing 12 and the external housing 11. The first circulating fan 41 may cause air to be sucked into the first circulating air inlet and the second circulating air inlet.

More specifically, air entering the first circulating air inlet may pass through the first circulating fan 41 and pass through the first communicating hole 891 of the side plate 89. Air passed through the first communicating hole 891 may be discharged to the outside of the cooking apparatus through the first circulating air outlet 911 of the service panel 91 and a second circulating air outlet 921 of a discharge panel 92.

However, in a case in which a separate communicating duct (not shown) is provided to discharge filtered oil mist to the outdoor, as described above, air entering the first circulating air inlet may be discharged to the outside of the cooking apparatus through the circulating air outlet formed in the ventilation duct panel 94.

This may be the same as the first circulating flow path V1 of the cooking apparatus 1 according to an embodiment of the disclosure.

However, air entering the second circulating air inlet may pass through the through hole 561 of the circulating plate 56 and flow to a space between the partition bracket 54 and the bottom bracket 53 through the communicating portion 522 of the rear bracket 52.

The partition bracket 54 may be closed without any opening. More specifically, no second communicating hole may be formed in the partition bracket 54, unlike the cooking apparatus 1 according to an embodiment of the disclosure.

However, the partition bracket 54 may be closed, and a second communication hole 551 may be formed in the circulating divider 55. Accordingly, air entering the second circulating air inlet may enter the space between the partition bracket 54 and the bottom bracket 53 and flow toward the first circulating fan 41 through the second communicating hole 551 of the circulating divider 55.

Thereafter, air passed through the first circulating fan 41 may flow to the upper portion of the internal housing 12 through the first communicating hole 891 of the side plate 89. The air may be discharged to the outside of the cooking apparatus through the first circulating air outlet 911 of the service panel 91 and the second circulating air outlet 921 of the discharge panel 92.

However, in a case in which a separate communicating duct (not shown) is provided to discharge filtered oil mist to the outdoor, as described above, air entering the second circulating air inlet may be discharged to the outside of the cooking apparatus through the circulating air outlet formed in the ventilation duct panel 94.

Accordingly, the cooking apparatus according to another embodiment of the disclosure may suck air into the first circulating air inlet and the second circulating air inlet with a suction force of the first circulating fan 41 by closing the partition bracket 54 and opening the circulating divider 55, unlike the cooking apparatus 1 according to an embodiment of the disclosure. That is, the first circulating flow path V1 and the second circulating flow path V2 may be formed as a single flow path via the first circulating fan 41.

Accordingly, a structure of the cooking apparatus may be more simplified, which reduces manufacturing cost. Also, because it is possible to replace configurations of the partition bracket 54 and the circulating divider 55 according to a user's need, complicating an internal design according to the number of circulating fans may be not needed.

Figure 9:
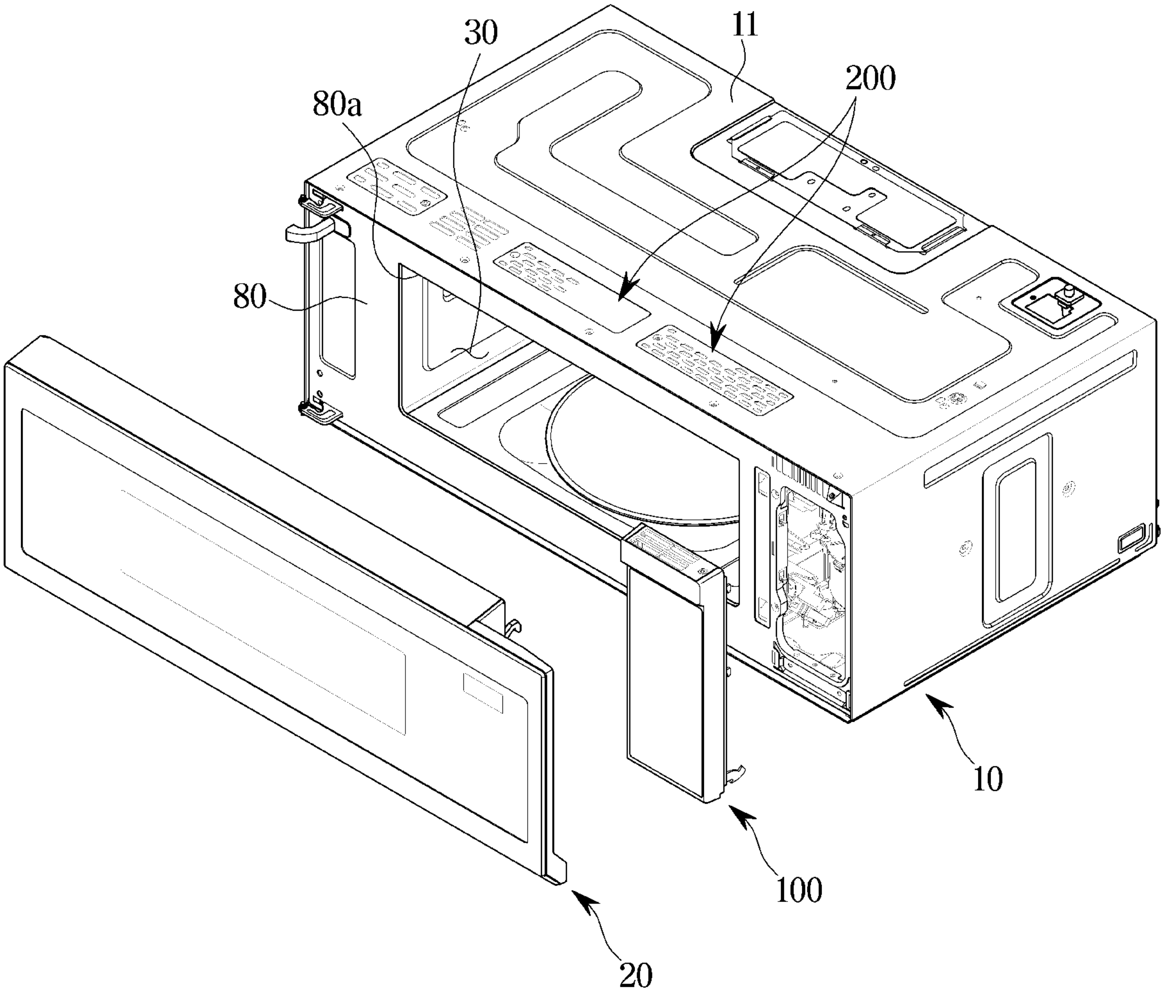
FIG. 9 is an exploded perspective view showing a door, a control unit, and a main body in a cooking apparatus according to an embodiment of the disclosure.
Figure 10:
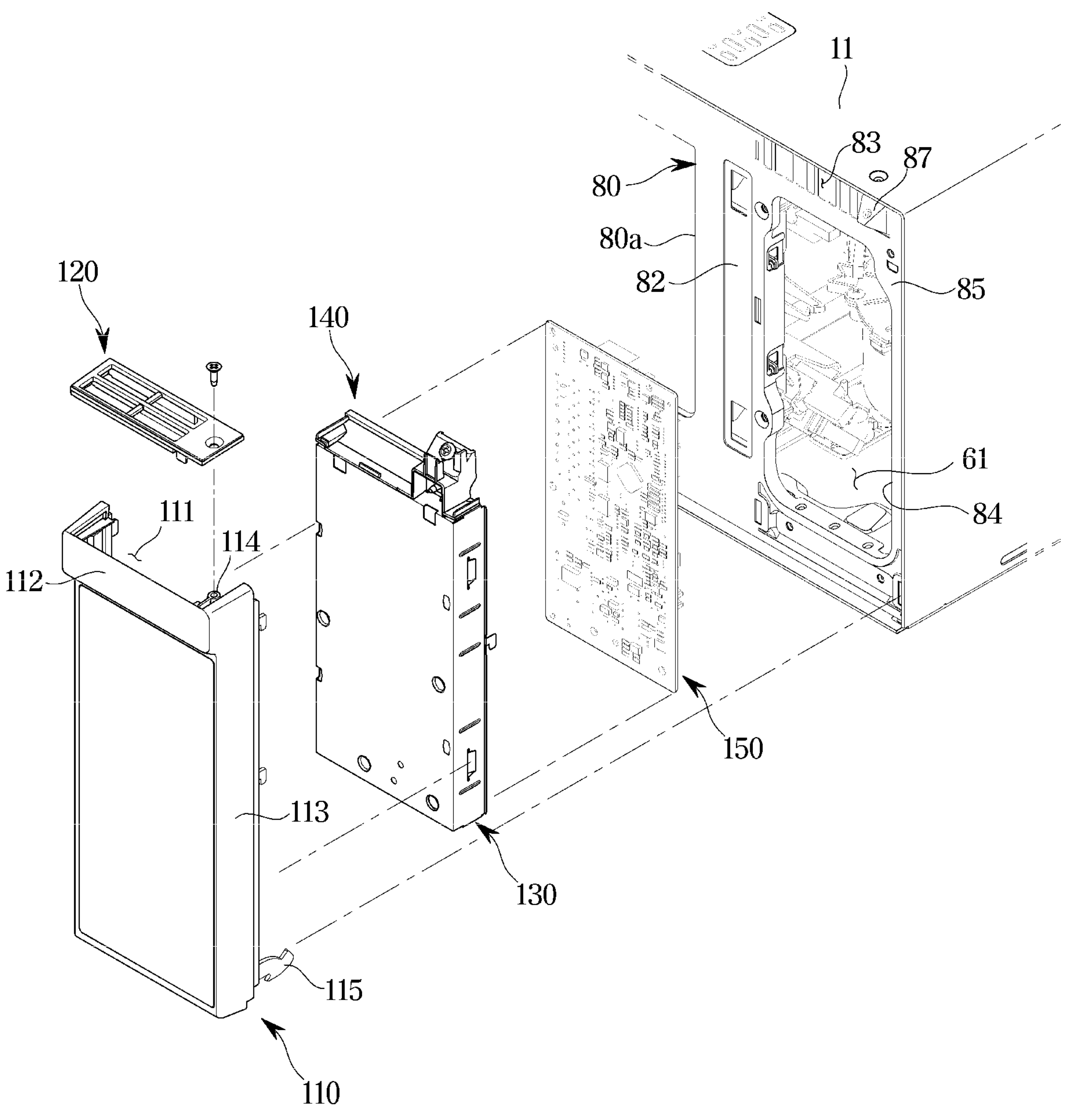
FIG. 10 is an enlarged, exploded perspective view showing the control unit and the main body of FIG. 9 according to an embodiment of the disclosure.

FIG. 9 is an exploded perspective view showing a door, a control unit, and a main body in a cooking apparatus according to an embodiment of the disclosure. FIG. 10 is an enlarged, exploded perspective view showing the control unit and the main body of FIG. 9.

Referring to FIGS. 9 and 10, the control unit 100 may be installed on the front portion of the main body 10. The door 20 may be rotatably coupled with the main body 10 to cover the front portions of the main body 10 and the control unit 100.

More specifically, the main body 10 may include the front plate 80. The front plate 80 may be installed on the front portion of the external housing 11. The discharge panel 200 and the service panel 91 may be detachably coupled with the top of the external housing 11. Also, in the top of the external housing 11, the cooling air outlet 93 may be incised and formed, although not limited thereto. However, the cooling air outlet 93 may also be formed in a separate panel that is detachable from the external housing 11.

The front plate 80 may include an opening *80a* communicating with the cooking room 30, and an installing portion 85 which is positioned to one side of the opening *80a* and on which the control unit 100 is installed.

Also, the front plate 80 may include a door fixing portion 82 positioned between the opening *80a* and the installing portion 85. More specifically, a door latch 211 which will be described below may be inserted into the door fixing portion 82 to maintain a state in which the door 20 closes the cooking room 30.

The service panel 91 in which the first circulating air outlet 911 is formed and the discharge panel 200 in which the second circulating air outlet 210 is formed may be biased to one side of the main body 10. More specifically, the service panel 91 and the discharge panel 200 may be arranged to be biased in a direction being maximally away from the control unit 100. This will be described in detail, below.

A portion of the rear surface of the door 20 may be depressed inward to accommodate the control unit 100. More specifically, the door 20 may be rotatably coupled with the main body 10 in such a way as to cover the front portion of the control unit 100. A user may open or close the door 20 by using a handle portion 23 formed between the control unit 100 and the door 20. Details about the door 20 will be described in detail, below.

The control unit 100 may include a case 110 and the suction grill 120 installed on an upper portion of the case 110.

The case 110 and the suction grill 120 may form an outer appearance of the control unit 100. More specifically, an opening 111 may be formed in the upper portion of the case 110, and the suction grill 120 may be coupled with the upper portion of the case 110 to cover the opening 111 of the case 110.

Also, the case 110 may be in a shape of a box of which the rear portion opens.

The case 110 may be installed on the one side of the front plate 80 and accommodate a circuit board 150 therein.

The case 110 may include an insertion lag 115 inserted into an insertion hole of the installing portion 85 of the front plate 80. The insertion lag 115 may extend from a rear portion of the case 110 toward the front plate 80. The insertion lag 115 may be substantially in a shape of a hook and fix the case 110 on the front plate 80.

The case 110 may include a board accommodating portion 113 for accommodating the circuit board 150. More specifically, the circuit board 150 and a bracket panel 130 on which the circuit board 150 is mounted may be accommodated in the board accommodating portion 113 of the case 110.

The case 110 may include a grill installing portion 112 extending upward from the board accommodating portion 113 and protruding forward from the board accommodating portion 113.

The grill installing portion 112 may form a portion of the cooling flow path C. More specifically, outside air may enter from above the grill installing portion 112 and flow downward from the grill installing portion 112. The opening 111 of the case 110 may be formed in an upper portion of the grill installing portion 112.

In other words, a front surface of the grill installing portion 112 may protrude forward from a front surface of the board accommodating portion 112. Also, a portion of the front surface of the grill installing portion 112 may extend in an up-down direction to enlarge an inflow space which outside air enters.

Accordingly, because the grill installing portion 112 protrudes forward from the board accommodating portion 113 of the case 110, an inlet area of the cooling flow path C may further increase in a front direction. Also, because the grill installing portion 112 extends upward from the board accommodating portion 113, the inlet area of the cooling flow path C may further increase in the up-down direction. That is, because an entire area through which cooling air enters increases, cooling efficiency of the cooking apparatus 1 may be raised.

The suction grill 120 may be coupled with the upper portion of the case 110 and include the first cooling air inlet 123 formed in a top of the case 110. The suction grill 120 may be screw-coupled with the case 110. This will be described in detail, below.

The control unit 100 may include the circuit board 150, the bracket panel 130 on which the circuit board 150 is mounted, and a guide member 140 installed on an upper portion of the bracket panel 130.

The bracket panel 130 may be accommodated inside the case 110. The bracket panel 130 may be substantially in a shape of a box of which the rear side opens. The circuit board 150 may be accommodated inside the bracket panel 130. The circuit board 150 may be fixed inside the bracket panel 130.

The bracket panel 130 may protect the circuit board 150 from an external impact or a foreign material.

The circuit board 150 may be accommodated in a rear side of the bracket panel 130 and positioned at a communicating portion 84 of the front plate 80. In other words, the circuit board 150 may communicate with the first machine room 61. Accordingly, cooling air may enter the suction grill 120 to cool the circuit board 150 while cooling components of the first machine room 61.

The guide member 140 may be installed on the upper portion of the bracket panel 130.

A preventing portion may be provided to prevent water or a foreign material from entering the circuit board 150 through the first cooling air inlet 123 of the suction grill 120.

The preventing portion may enable water collected on an upper surface of the preventing portion to be easily discharged to the outside of the control unit 100. The guide member 140 may be positioned below the second cooling air inlet 83 of the front plate 80.

Figure 11:
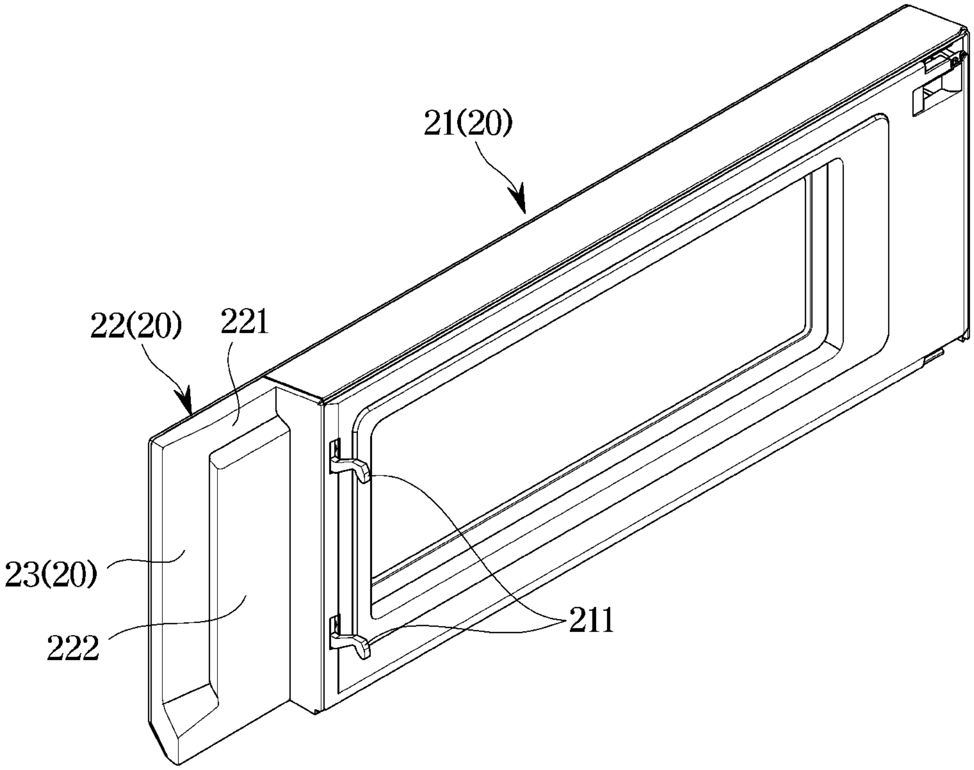
FIG. 11 is a rear perspective view of the door shown in FIG. 9 according to an embodiment of the disclosure.

FIG. 11 is a rear perspective view of the door shown in FIG. 9.

As shown in FIGS. 9 to 11, the door 20 may close and open the opening 80*a* of the front plate 80 and cover a front portion of the case 110. A portion of the rear surface of the door 20 may be depressed inward to accommodate the case 110.

The door 20 may include a sealing portion 21 for opening and closing the opening 80*a* in front of the cooking room 30.

The sealing portion 21 may be positioned in front of the main body 10. The sealing 21 may include a shielding member (not shown) to prevent a high frequency existing inside the cooking room 30 from leaking out. A portion of the sealing portion 21 may be transparent to enable a user to check the inside of the cooking room 30 from the outside.

The sealing portion 21 may include the door latch 211 inserted in the door fixing portion 82 of the front plate 80. The door latch 211 may extend from a rear surface of the sealing portion 211 toward the main body 10 and be formed at a location corresponding to the door fixing portion 82.

One side of the sealing portion 21 may be hinge-coupled with the main body 10 such that the door 20 is rotatable with respect to the main body 10.

The door 20 may include a cover portion 22 extending from a side portion of the sealing portion 21 and covering the front portion of the case 110.

The cover portion 22 may be formed by being depressed inward from the rear surface of the door 20. More specifically, the cover portion 22 may have a smaller thickness than the sealing portion 21. Accordingly, the control unit 100 may be accommodated behind the cover portion 22. That is, the control unit 100 may be positioned to one side of the sealing portion 21.

The cover portion 22 may include a first cover portion 221 and a second cover portion 222.

The first cover portion 221 may be depressed forward from the rear surface of the door 20 to cover the front surface of the grill installing portion 112 of the case 110.

The second cover portion 222 may be depressed forward from the rear surface of the door 20 to cover a portion of the front surface of the board accommodating portion 113 of the case 110.

The first cover portion 221 may be further depressed forward than the second cover portion 222. Because the grill installing portion 112 of the case 110 protrudes forward from the board accommodating portion 113, the rear surface of the door 20 may also correspond to the grill installing portion 112.

The door 20 may include the handle portion 23 that is spaced from the front portion of the control unit 100 to form a grip space.

More specifically, the handle portion 23 may be formed at a lower area of the first cover portion 221. The handle portion 23 may be positioned to one side of the second cover portion 222.

The handle portion 23 may be provided on the same plane as the first cover portion 221. More specifically, the handle portion 23 may be not stepped to the first cover portion 221. Accordingly, the handle portion 23 may be further depressed forward from the rear surface of the door 20 than the second cover portion 222, like the first cover portion 221.

Figure 12:
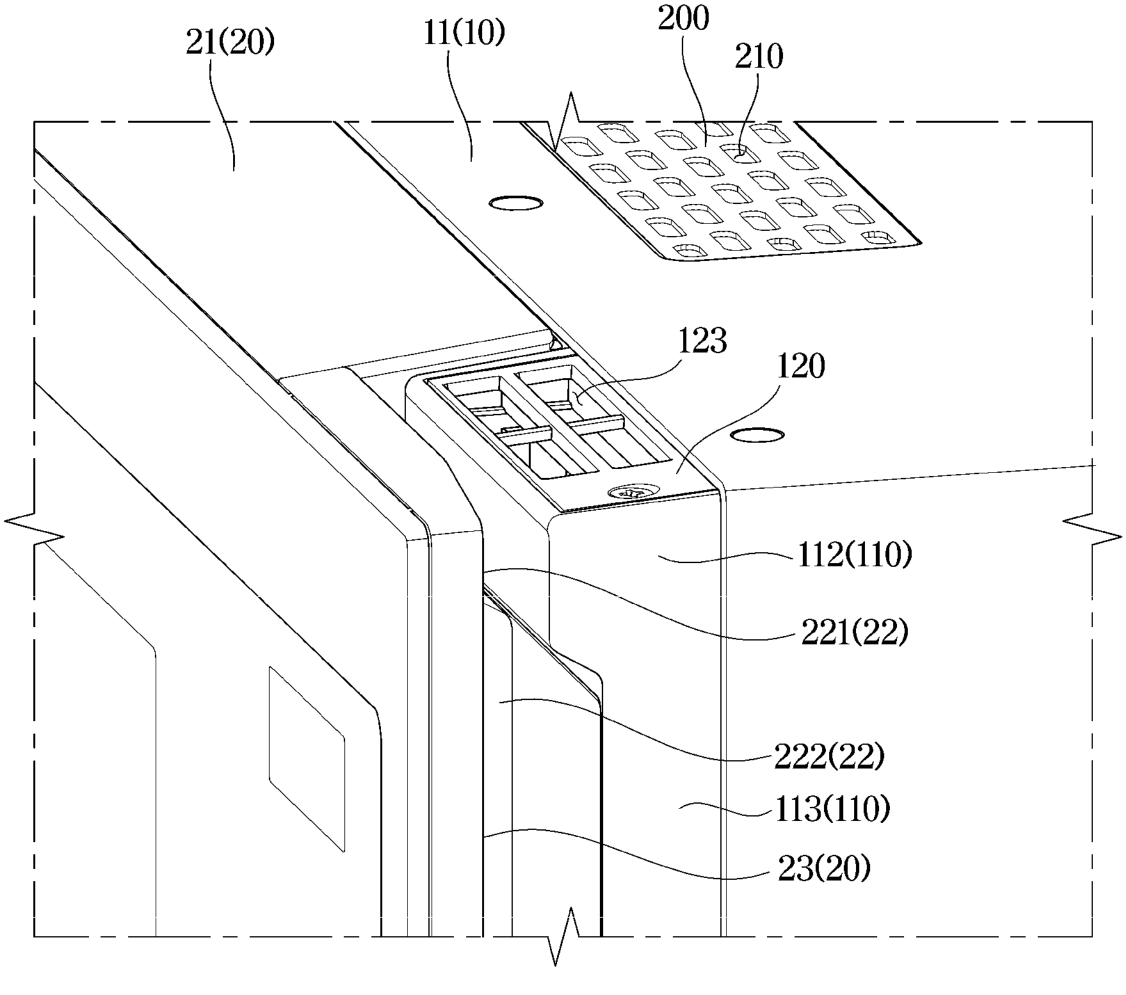
FIG. 12 is an exploded view showing a state in which a control unit of a cooking apparatus according to an embodiment of the disclosure is covered by a door.

FIG. 12 is an exploded view showing a state in which a control unit of a cooking apparatus according to an embodiment of the disclosure is covered by a door.

Referring to FIG. 12, the control unit 100 may be positioned between the door 20 and the main body 10. More specifically, the control unit 100 may be positioned behind the cover portion 22 of the door 20. Also, the control unit 100 may be positioned to one side of the sealing portion 21 of the door 20.

The suction grill 120 of the control unit 100 may be aligned with the sealing portion 21 at one side of the sealing portion 21.

Also, the discharge panel 200 in which the second circulating air outlet 210 is formed may be formed on the top of the main body 10. More specifically, the discharge panel 200 may be installed on the external housing 11 to be positioned behind the sealing portion 21 of the door 20. In other words, the sealing portion 21 may be positioned in front of the circulating air outlet.

The first cover portion 221 of the door 20 may cover the front surface of the grill installing portion 112 of the case 110. The second cover portion 222 of the door 20 may cover the front surface of the board accommodating portion 113 of the case 110. The grip space may be formed between the handle portion 23 provided to one side of the second cover portion 222 of the door 20 and the front surface of the board accommodating portion 113 of the case 110.

Figure 13:
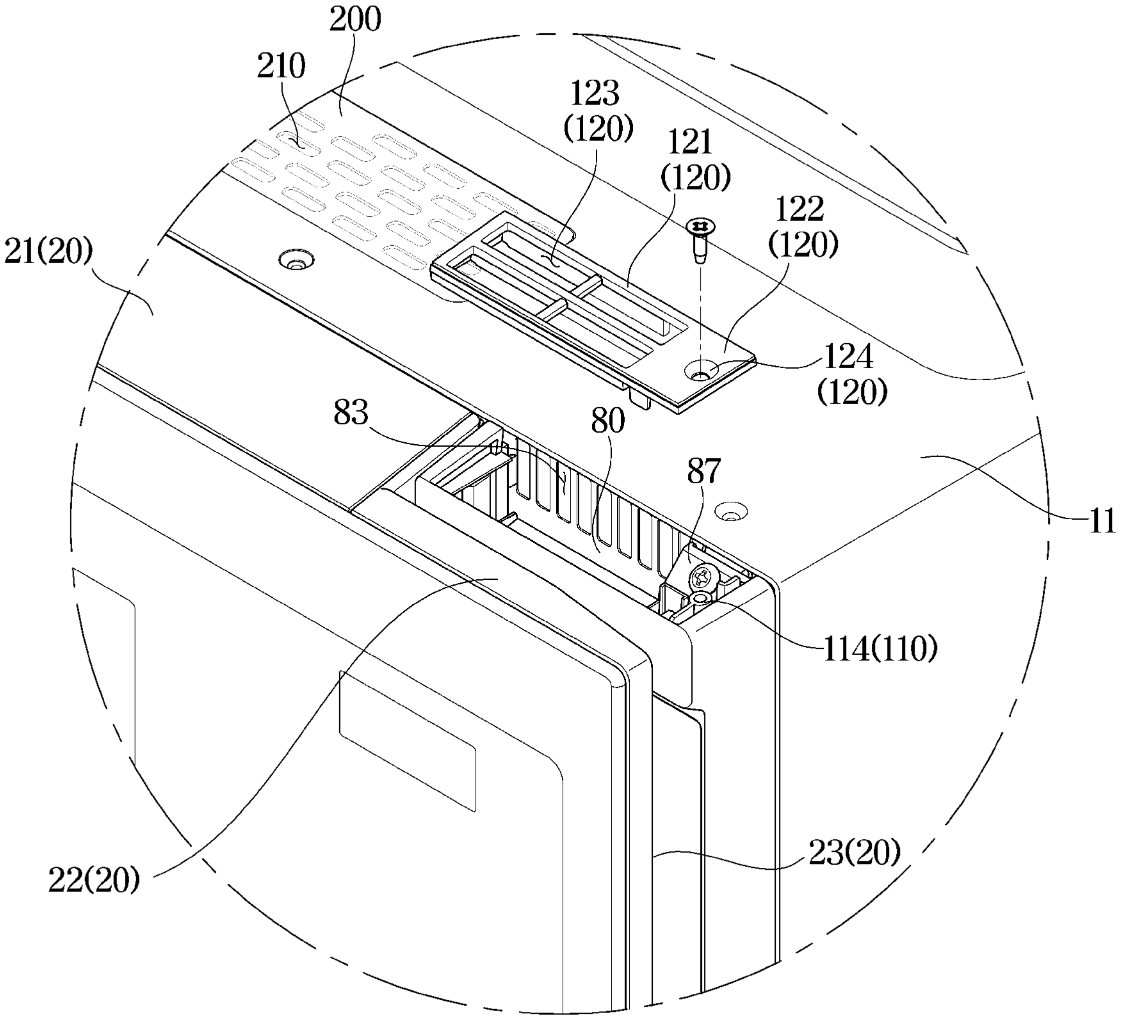
FIG. 13 shows a state before a suction grill of a cooking apparatus according to an embodiment of the disclosure is installed in a case.
Figure 14:
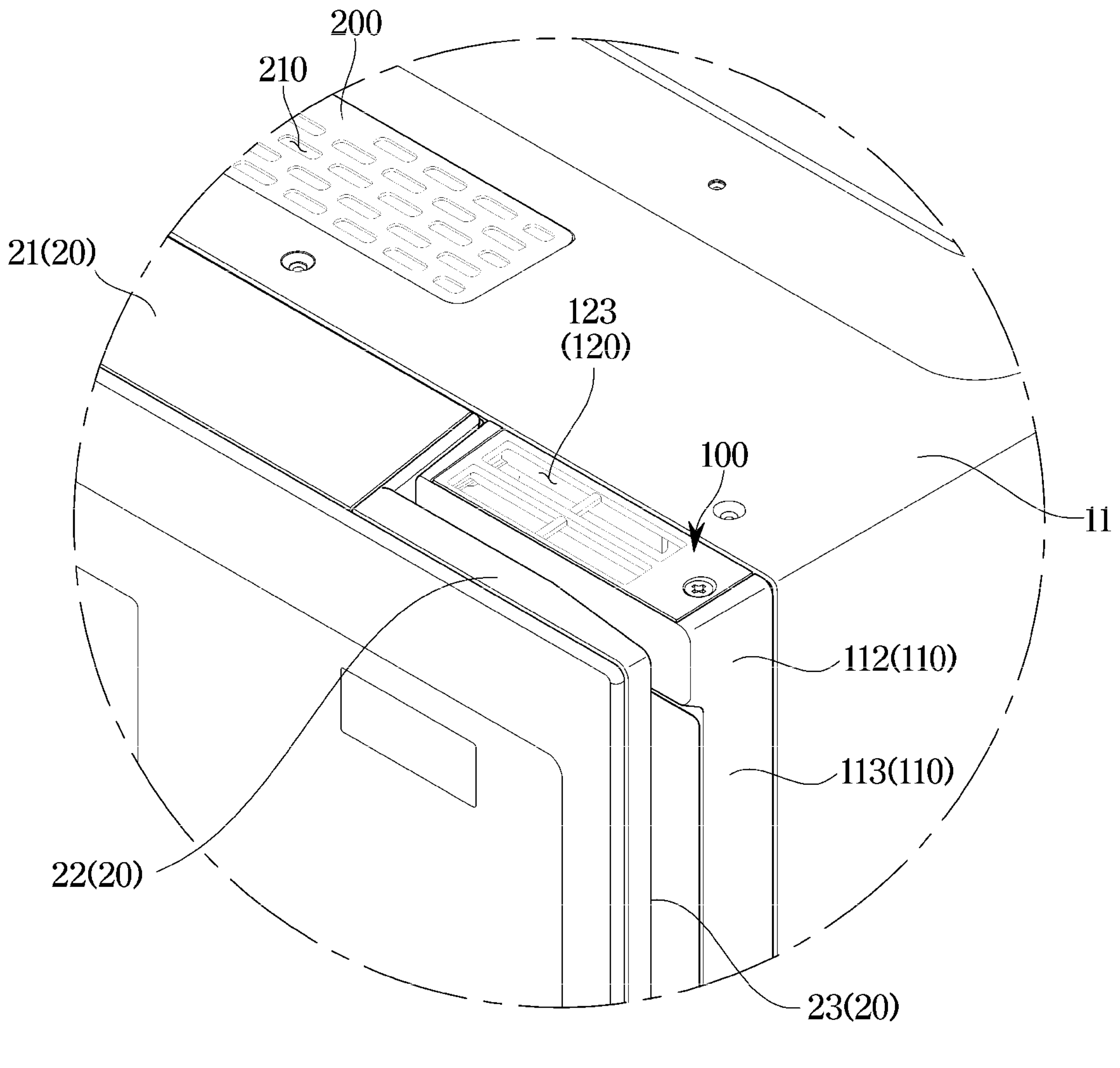
FIG. 14 shows a state after the suction grill of FIG. 13 is installed in the case according to an embodiment of the disclosure.

FIG. 13 shows a state before a suction grill of a cooking apparatus according to an embodiment of the disclosure is installed in a case. FIG. 14 shows a state after the suction grill of FIG. 13 is installed in the case.

Referring to FIGS. 13 and 14, the case 110 of the control unit 100 may include a coupling boss 114.

The coupling boss 114 may be formed in an inner side of the grill installing portion 112 of the case 110. The coupling boss 114 may couple the case 110 with the suction grill 120.

The suction grill 120 may include a grill portion 121 and a coupling portion 122.

In the grill portion 121, the first cooling air inlet 123 may be formed. The coupling portion 122 may be positioned to one side of the grill portion 121. A coupling hole 124 for coupling with the case 110 may be formed in the coupling portion 122.

The suction grill 120 may be detachable from the case 110 to form an entrance of the cooling flow path C.

Air entering the first cooling air inlet 123 of the suction grill 120 may enter the inside of the main body 10 through the second cooling air inlet 83 of the front plate 80.

The first cooling air inlet 123 of the suction grill 120 may be biased with respect to the second circulating air outlet 210 of the discharge panel 200. More specifically, because the first cooling air inlet 123 is provided in front of the main body 10, and the second circulating air outlet 210 is provided in the top of the main body 10, the first cooling air inlet 123 may be biased with respect to the second circulating air outlet 210 in a front-back direction of the cooking apparatus 1.

Also, because the first cooling air inlet 123 is provided to one side of the sealing portion 21 of the door 20 and the second circulating air outlet 210 is provided behind the sealing portion 21, the first cooling air inlet 123 may be biased with respect to the second circulating air outlet 210 in a left-right direction of the cooking apparatus 1. In other words, because the first cooling air inlet 123 is provided behind the cover portion 22 of the door 20 and the second circulating air outlet 210 is provided behind the sealing portion 21 of the door 20, the first cooling air inlet 123 may be biased with respect to the second circulating air outlet 210 in the left-right direction of the cooking apparatus 1.

Accordingly, because the first cooling air inlet 123 forming an entrance of the cooling flow path C and the second circulating air outlet 210 forming an exit of the circulating flow path are biased with respect to each other, a phenomenon in which heated air discharged from the circulating flow path enters the cooling flow path C may be reduced. Accordingly, the entire cooling efficiency of the cooking apparatus 1 may be improved.

Figure 15:
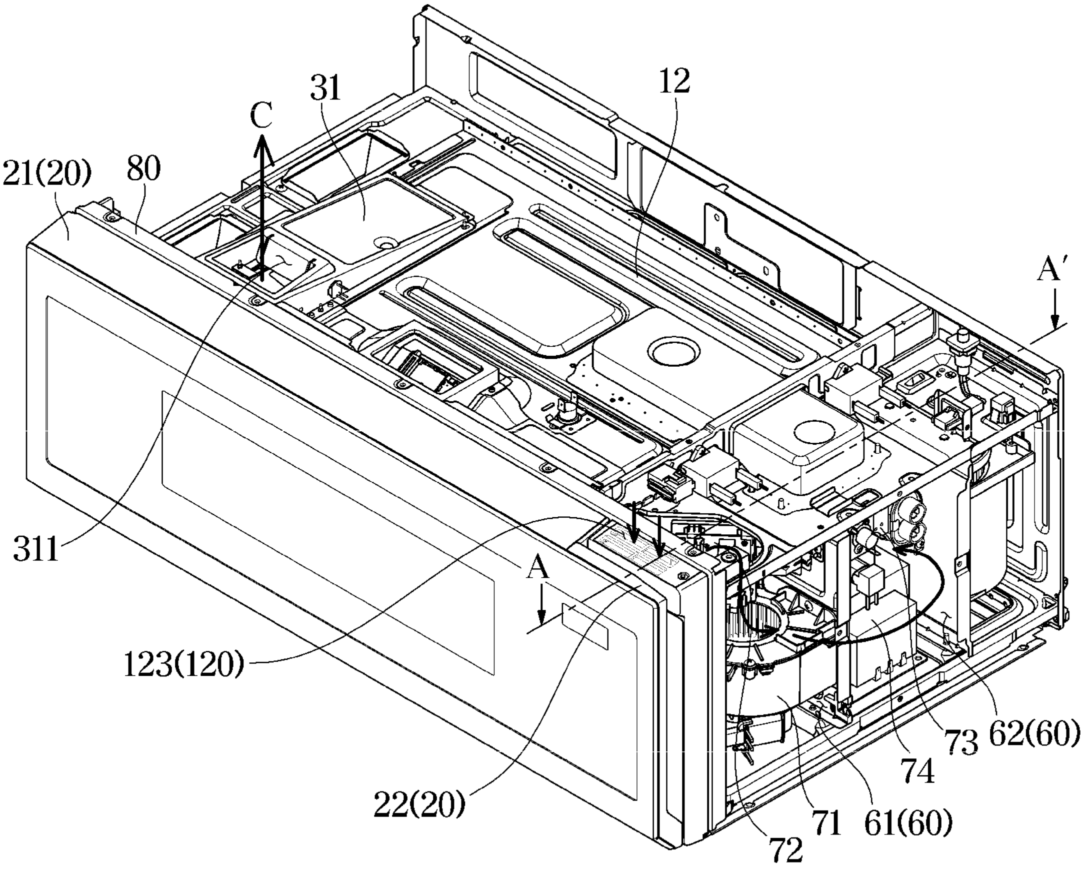
FIG. 15 is a perspective view of a cooking apparatus according to an embodiment of the disclosure after an external housing is removed from the cooking apparatus.
Figure 16:
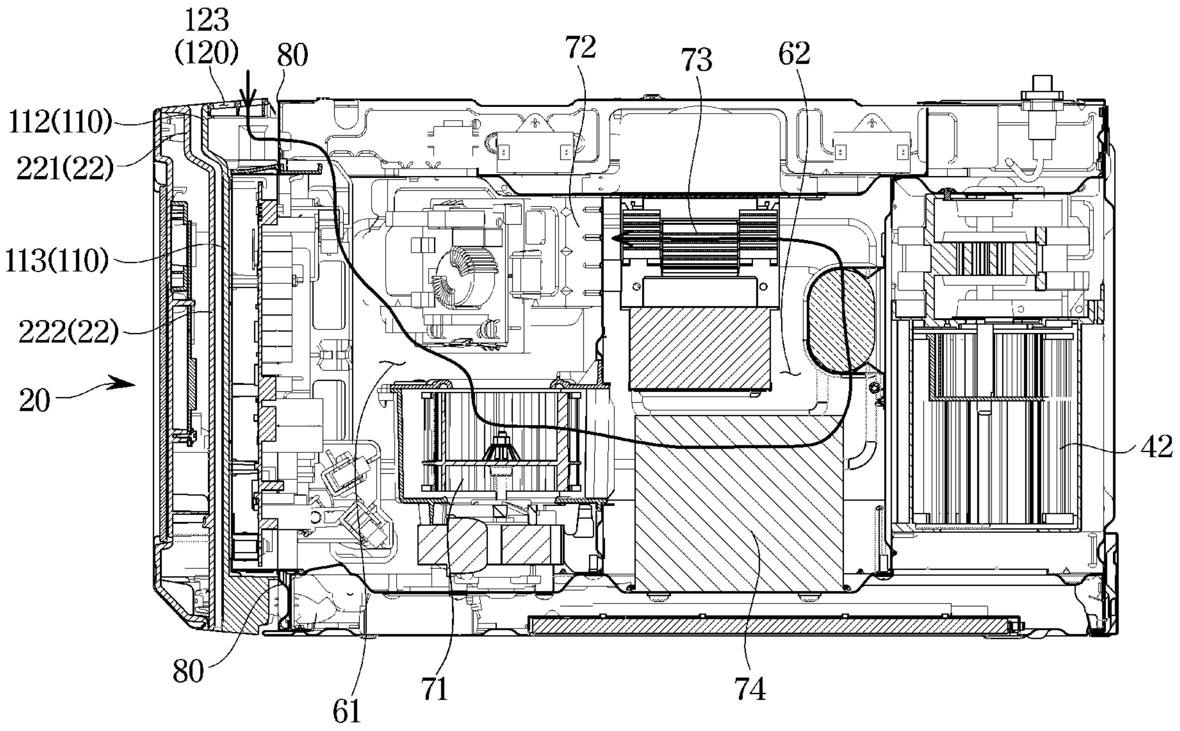
FIG. 16 is a cross-sectional view taken along line A-A' of FIG. 15 according to an embodiment of the disclosure.
Figure 17:
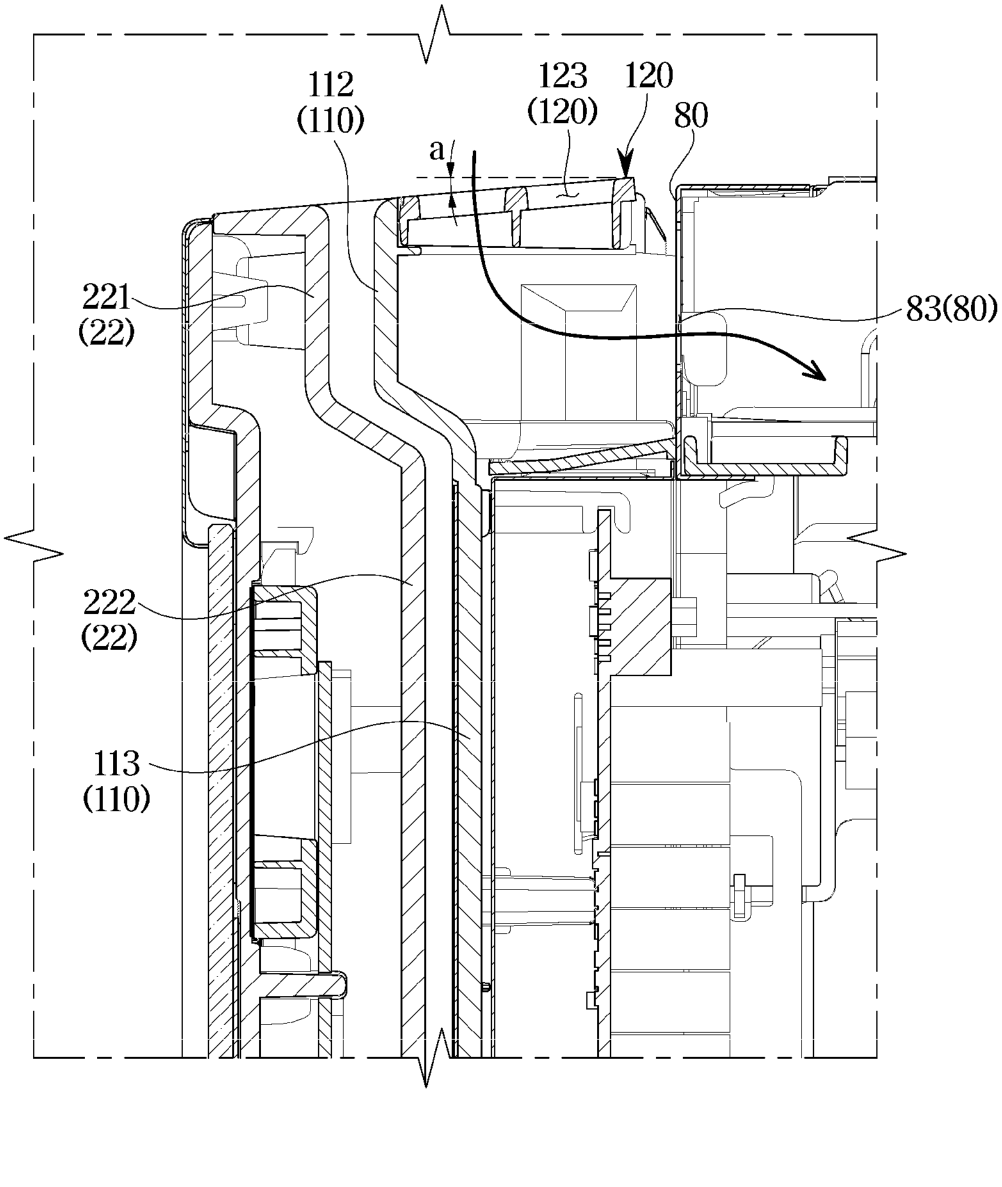
FIG. 17 is an enlarged view of a upper-front portion of FIG. 16 according to an embodiment of the disclosure.

FIG. 15 is a perspective view of a cooking apparatus according to an embodiment of the disclosure after an external housing is removed from the cooking apparatus. FIG. 16 is a cross-sectional view taken along line A-A' of FIG. 15. FIG. 17 is an enlarged view of a upper-front portion of FIG. 16.

Referring to FIGS. 15 to 17, a flow of air flowing along the cooling flow path C will be described in detail.

First, outside air may enter the inside of the control unit 100 through the first cooling air inlet 123 formed in the upper portion of the control unit 100.

The air entering the inside of the control unit 100 may flow to the first machine room 61 through the second cooling air inlet 83 (see FIG. 13) of the front plate 80.

The air entering the first machine room 61 may cool the rear surface of the control unit 100 and the inside of the first machine room 61 and then flow to the second machine room 62 through the cooling fan 71.

The air entering the second machine room 62 may cool the magnetron 73 and the transformer 74 and then flow to the guide duct 72 while being prevented from flowing to the second circulating fan 42 by the cooling divider 51.

The air entering the guide duct 72 may flow to the cooking room 30 and cool the rear surface of the sealing portion 21 of the door 20. After the air cools the rear surface of the sealing portion 21 of the door 20, the air may flow to the exhaust duct 31 communicating with the cooking room 30 at the upper surface.

The air entering the exhaust duct 31 may be discharged to the outside of the cooking apparatus 1 through an exhaust portion 311 and the cooling air outlet 93 (see FIG. 93) of the external housing 11. The above-described path may be the cooling flow path C of the cooking apparatus 1 according to an embodiment of the disclosure.

Referring to FIG. 16, the first cover portion 221 and the second cover portion 222 of the door 20 may be shaped to correspond to the grill installing portion 112 and the board accommodating portion 113 of the case 110 of the control unit 100. More specifically, because the grill installing portion 112 protrudes forward from the board accommodating portion 113, the first cover portion 221 of the door 20 may also be further depressed forward than the second cover portion 222.

Accordingly, the door 20 of the cooking apparatus 1 according to an embodiment of the disclosure may form a wider entrance of the cooling flow path C by adjusting the thickness of the cover portion 22 while maintaining a constant thickness of the sealing portion 21. Accordingly, slimness of the door 20 may be realized.

More specifically, by enlarging the grill installing portion 112 of the case 110, a size of the suction grill 120 may increase, thereby securing a greater quantity of air entering the cooling flow path C.

Referring to FIG. 17, the suction grill 120 according to an embodiment of the disclosure may be inclined in the front direction. More specifically, an inclination angle a of the suction grill 120 with respect to a horizontal reference line may be about 5 degrees or less.

In a case in which the inclination angle a of the suction grill 120 is too great, a height of the door 20 may increase correspondingly although a quantity of air entering the cooling flow path C increases.

Also, in a case in which the inclination angle a of the suction grill 120 is too small, a sufficient quantity of air entering the cooling flow path C may be not secured.

In the cooking apparatus 1 according to an embodiment of the disclosure, cooling air may enter through the suction grill 120 positioned to one side of the sealing portion 21 of the door 20 and accordingly, a sufficient width in the left-right direction may be not secured. Accordingly, by forming the suction grill 120 inclined in the front direction, a greater inflow quantity of cooling air may be secured with a limited width.

Figure 18:
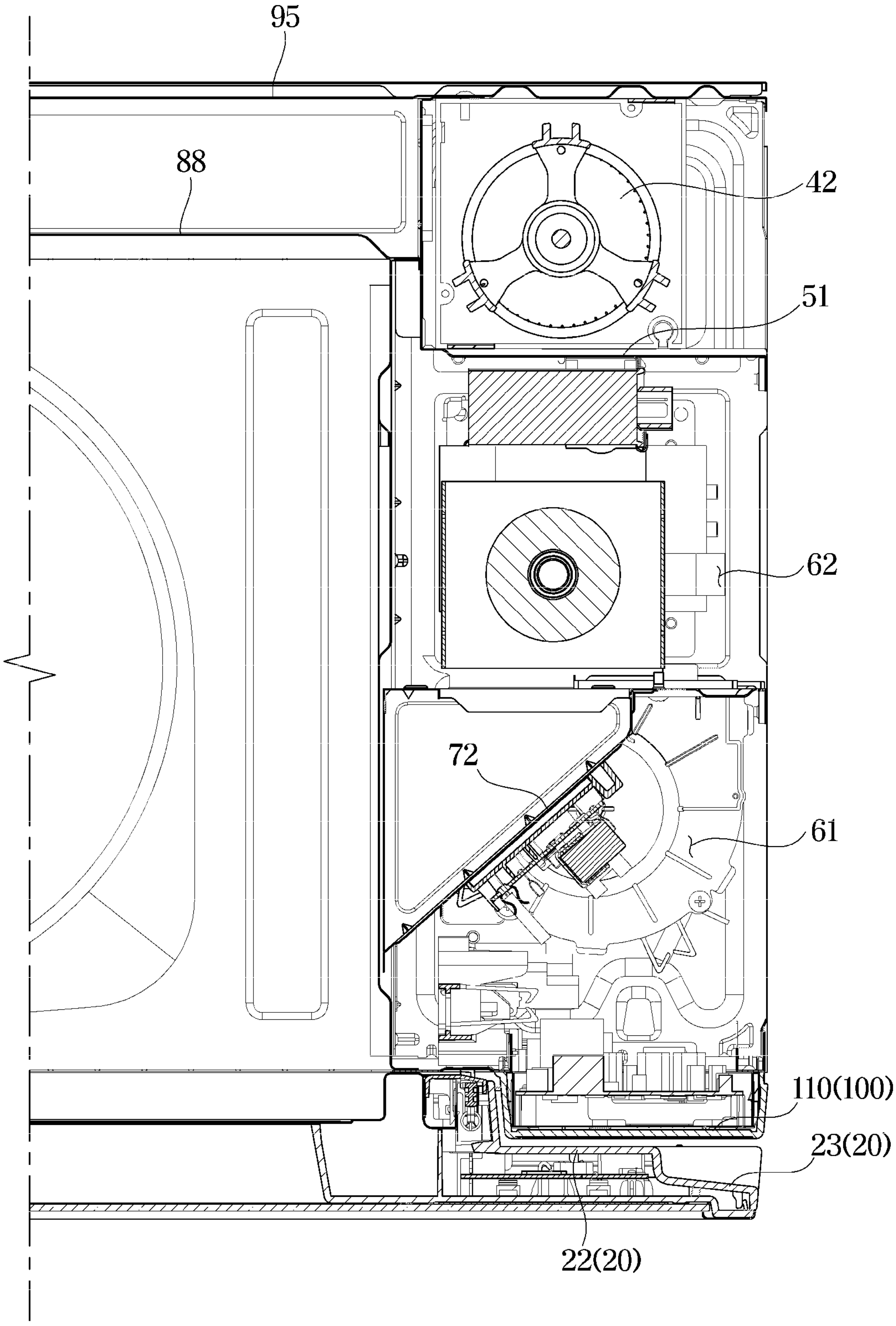
FIG. 18 is an enlarged cross-sectional view showing one side of a cooking apparatus according to an embodiment of the disclosure.

FIG. 18 is an enlarged cross-sectional view showing a right side of a cooking apparatus according to an embodiment of the disclosure.

As shown in FIG. 18, in an outer side of the door 20 of the cooking apparatus 1 according to an embodiment of the disclosure, the handle portion 23 may be formed. More specifically, the handle portion 23 may be formed at a side portion of the second cover portion 222.

Also, referring to FIG. 18, the second machine room 62 may be formed behind the first machine room 61, and the second circulating fan 42 may be positioned behind the second machine room 62.

Because the second circulating fan 42 is positioned behind the second machine room 62, a height in up-down direction of the cooking apparatus 1 may be reduced. Accordingly, the cooking apparatus 1 having a slimmer height may be implemented.

In other words, as shown in FIGS. 7 and 18, the machine room 60 and the second circulating fan 42 may be positioned to a right side of the cooking room 30, and the first circulating fan 41 may be positioned to a left side of the cooking room 30. Accordingly, the cooking apparatus 1 having a slimmer height in the up-down direction may be implemented.

Also, because the first cooling air inlet 123 is formed in the top of the cooking apparatus 1, and all of the cooling air outlet 93 and the first and second circulating air outlets 911 and 210 are formed in the top of the cooking apparatus 1, a height required for an air inlet or an air outlet may be reduced.

That is, the cooking apparatus 1 according to an embodiment of the disclosure may have a slim thickness in the up-down direction.

Also, by arranging an entrance of the cooling flow path C and exits of the circulating flow paths V1 and V2 to be maximally away from each other, cooling efficiency of the cooking apparatus 1 may be more improved.

By positioning the cooling air inlet of the cooling flow path and the circulating air outlet of the circulating flow path to be maximally away from each other, the cooling efficiency of the cooking apparatus may be improved.

By forming the inclined suction grill, the door may have a slim thickness and the air inflow area of the cooling flow path may increase.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A cooking apparatus comprising:

a main body forming a cooking room therein and including a front plate with an opening to the cooking room;

a case positioned to one side of the opening and formed to accommodate a circuit board therein;

a door opening and closing the opening and covering a front portion of the case, wherein a portion of a rear surface of the door is depressed inward to accommodate the case;

a circulating air outlet formed at a top of the main body, and configured to filter and discharge air received from below the main body; and a suction grill attachable to and detachable from an upper portion of the case and accommodated in one side of the door, wherein a cooling air inlet, which allows cooling air to enter through the suction grill, is positioned in front of the circulating air outlet.

2. The cooking apparatus of claim 1, further comprising:

a discharge panel attachable to and detachable from the main body, wherein the circulating air outlet is formed in the discharge panel, and the discharge panel is positioned behind the door.

3. The cooking apparatus of claim 1, wherein the case comprises:

a board accommodating portion formed to accommodate the circuit board; and a grill installing portion formed to extend upward from the board accommodating portion and protrude forward from the board accommodating portion.

4. The cooking apparatus of claim 3, wherein the suction grill is coupleable with the grill installing portion, and air enters the upper portion of the case through the suction grill.

5. The cooking apparatus of claim 3, wherein the door comprises:

a first cover portion depressed along a front direction to cover a front surface of the grill installing portion;

a second cover portion to cover a portion of a front surface of the board accommodating portion; and a handle portion positioned to one side of the second cover portion and forming a grip space in front of the board accommodating portion.

6. The cooking apparatus of claim 1, wherein the suction grill is inclined along a front direction of the door.

7. The cooking apparatus of claim 1, wherein the cooling air inlet is a first cooling air inlet, and the front plate includes a second cooling air inlet provided behind the first cooling air inlet to allow air entering the first cooling air inlet to flow to an inside of the main body.

8. The cooking apparatus of claim 7, wherein the second cooling air inlet is formed by partially cutting a front portion of the front plate.

9. The cooking apparatus of claim 1, wherein the door comprises:

a sealing portion opening and closing the opening in front of the cooking room; and a cover portion positioned to one side of the sealing portion and to cover the front portion of the case, wherein a thickness of the cover portion is smaller than a thickness of the sealing portion.

10. The cooking apparatus of claim 9, wherein the sealing portion is positioned in front of the circulating air outlet, and the suction grill is positioned to the one side of the sealing portion.

11. The cooking apparatus of claim 1, further comprising:

a machine room provided behind the front plate where air entering through the suction grill enters the machine room; and a guide duct to guide the air entering the machine room to the cooking room.

12. The cooking apparatus of claim 11, further comprising:

an exhaust duct to discharge air entering the cooking room through the guide duct to outside.

13. The cooking apparatus of claim 1, wherein the suction grill comprises:

a grill portion in which the cooling air inlet is formed; and a coupling portion positioned to one side of the grill portion and coupleable with the case.

14. The cooking apparatus of claim 1, further comprising:

an internal housing forming the cooking room;

an external housing positioned outside the internal housing and forming an outer appearance of the cooking apparatus;

at least one circulating fan positioned between the internal housing and the external housing, and configured to suck polluted air from below the main body; and a partition bracket forming a flow path along with which air drawn by the at least one circulating fan and entering an inside of the main body flowing, the partition bracket positioned behind the internal housing and formed to extend horizontally between the internal housing and the external housing.

* * * * *